(12) United States Patent
Zha et al.

(10) Patent No.: US 8,048,306 B2
(45) Date of Patent: *Nov. 1, 2011

(54) SCOURING METHOD

(75) Inventors: Fufang Zha, Hurlstone Park (AU);
Clinton V. Kopp, Bismarck, ND (US);
Robert J. McMahon, Concord (AU);
Warren T. Johnson, Bligh Park (AU);
Thomas W. Beck, North Richmond (AU)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/316,593

(22) Filed: Dec. 22, 2005

(65) Prior Publication Data

US 2006/0131234 A1 Jun. 22, 2006

Related U.S. Application Data

(63) Continuation of application No. 10/805,608, filed on Mar. 19, 2004, now abandoned, which is a continuation of application No. 10/674,694, filed on Sep. 30, 2003, now abandoned, which is a continuation of application No. 10/369,813, filed on Feb. 18, 2003, now abandoned, which is a continuation of application No. 09/336,059, filed on Jun. 18, 1999, now Pat. No. 6,555,005, which is a continuation of application No. PCT/AU97/00855, filed on Dec. 18, 1997.

(30) Foreign Application Priority Data

Dec. 20, 1996 (AU) .................................. PO4312
Sep. 1, 1997 (AU) .................................. PO8918

(51) Int. Cl.
*B01D 61/00* (2006.01)

(52) U.S. Cl. ..................... 210/636; 210/791; 210/321.69
(58) Field of Classification Search .................. 210/636, 210/760, 791, 798, 321.69, 321.79, 321.8, 210/321.89, 411, 500.23
See application file for complete search history.

(56) References Cited

U.S. PATENT DOCUMENTS

| 256,008 A | 4/1882 | Leak |
| 285,321 A | 9/1883 | Tams |
| 1,997,074 A | 4/1935 | Novotny |
| 2,080,783 A | 5/1937 | Petersen |

(Continued)

FOREIGN PATENT DOCUMENTS

AU 34400/84 9/1983

(Continued)

OTHER PUBLICATIONS

Derwent Abstract Accession No. 2001-142268/15, J01 JP, A1, 2000342932 (Mitsubishi Rayon Co. Ltd.), Dec. 12, 2000.

(Continued)

*Primary Examiner* — David Sorkin

(57) ABSTRACT

A method and apparatus for removing fouling materials from the surface of a plurality of porous membranes (9) arranged in a membrane module (4) by providing, from within the module, by means (10) other than gas passing through the pores of said membranes, gas bubbles in a uniform distribution relative to the porous membrane array such that the bubbles move past the surfaces of the membranes (9) to dislodge fouling materials therefrom. The membranes (9) are arranged in close proximity to one another and mounted to prevent excessive movement therebetween. The bubbles also produce vibration and rubbing together of the membranes to further assist removal of fouling materials.

24 Claims, 19 Drawing Sheets

U.S. PATENT DOCUMENTS

| | | |
|---|---|---|
| 2,105,700 A | 1/1938 | Ramage |
| 2,843,038 A | 7/1958 | Manspeaker |
| 2,926,086 A | 2/1960 | Chenicek et al. |
| 3,139,401 A | 6/1964 | Hach |
| 3,183,191 A | 5/1965 | Hach |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,765 A | 10/1969 | Okey et al. |
| 3,492,698 A | 2/1970 | Geary et al. |
| 3,501,798 A | 3/1970 | Bray |
| 3,556,305 A | 1/1971 | Shorr |
| 3,591,010 A | 7/1971 | Pall |
| 3,625,827 A | 12/1971 | Wildi et al. |
| 3,654,147 A | 4/1972 | Levin et al. |
| 3,693,406 A | 9/1972 | Tobin |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hall et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,731 A | 8/1978 | Yamazaki |
| 4,107,043 A | 8/1978 | McKinney |
| 4,138,460 A | 2/1979 | Tigner |
| 4,183,890 A | 1/1980 | Bollinger |
| 4,188,817 A | 2/1980 | Steigelmann et al. |
| 4,190,411 A | 2/1980 | Fujimoto |
| 4,192,750 A | 3/1980 | Elfes et al. |
| 4,193,780 A | 3/1980 | Cotton et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,315,819 A | 2/1982 | King et al. |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis |
| 4,650,596 A | 3/1987 | Schleuter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A * | 10/1989 | Ohkubo et al. .......... 210/321.69 |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,963,304 A | 10/1990 | Im et al. |
| 4,968,430 A | 11/1990 | Hildenbrand et al. |
| 4,968,733 A | 11/1990 | Muller et al. |
| 4,969,997 A | 11/1990 | Klüver et al. |
| 4,988,444 A | 1/1991 | Applegate et al. |
| 4,999,038 A | 3/1991 | Lundberg |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,065 A | 12/1991 | Effenberger et al. |
| 5,076,925 A | 12/1991 | Roesink et al. |

| Patent | Date | Inventor | Ref |
|---|---|---|---|
| 5,079,272 A | 1/1992 | Allegrezza et al. | |
| 5,094,750 A | 3/1992 | Kopp et al. | |
| 5,094,867 A | 3/1992 | Detering et al. | |
| 5,098,567 A | 3/1992 | Nishiguchi | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,138,870 A | 8/1992 | Lyssy | |
| 5,147,553 A | 9/1992 | Waite | |
| 5,151,191 A * | 9/1992 | Sunaoka et al. | 210/644 |
| 5,151,193 A | 9/1992 | Grobe et al. | |
| 5,158,721 A | 10/1992 | Allegrezza et al. | |
| 5,169,528 A | 12/1992 | Karbachsch et al. | |
| 5,169,530 A | 12/1992 | Schucker et al. | |
| 5,182,019 A | 1/1993 | Cote et al. | |
| 5,186,821 A | 2/1993 | Murphy | |
| 5,192,442 A | 3/1993 | Piccirillo et al. | |
| 5,192,456 A * | 3/1993 | Ishida et al. | 210/791 |
| 5,192,478 A | 3/1993 | Caskey | |
| 5,194,149 A | 3/1993 | Selbie et al. | |
| 5,198,116 A | 3/1993 | Comstock et al. | |
| 5,198,162 A | 3/1993 | Park et al. | |
| 5,209,852 A * | 5/1993 | Sunaoka et al. | 210/636 |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A * | 9/1993 | Cote et al. | 210/636 |
| 5,262,054 A | 11/1993 | Wheeler | |
| 5,271,830 A | 12/1993 | Faivre et al. | |
| 5,275,766 A | 1/1994 | Gadkaree et al. | |
| 5,286,324 A | 2/1994 | Kawai et al. | |
| 5,290,451 A | 3/1994 | Koster et al. | |
| 5,290,457 A | 3/1994 | Karbachsch et al. | |
| 5,297,420 A | 3/1994 | Gilliland et al. | |
| 5,316,671 A | 5/1994 | Murphy | |
| 5,320,760 A | 6/1994 | Freund et al. | |
| 5,353,630 A | 10/1994 | Soda et al. | |
| 5,354,470 A | 10/1994 | Seita et al. | |
| 5,358,732 A | 10/1994 | Seifter et al. | |
| 5,361,625 A | 11/1994 | Ylvisaker | |
| 5,364,527 A | 11/1994 | Zimmermann et al. | |
| 5,364,529 A | 11/1994 | Morin et al. | |
| 5,374,353 A | 12/1994 | Murphy | |
| 5,389,260 A | 2/1995 | Hemp et al. | |
| 5,393,433 A | 2/1995 | Espenan et al. | |
| 5,396,019 A | 3/1995 | Sartori et al. | |
| 5,401,401 A | 3/1995 | Hickok et al. | |
| 5,401,405 A | 3/1995 | McDougald | |
| 5,403,479 A | 4/1995 | Smith et al. | |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,451,317 A | 9/1995 | Ishida et al. | |
| 5,458,779 A | 10/1995 | Odegaard | |
| 5,468,397 A | 11/1995 | Barboza et al. | |
| 5,470,469 A | 11/1995 | Eckman | |
| 5,477,731 A | 12/1995 | Mouton | |
| 5,479,590 A | 12/1995 | Lin | |
| 5,480,553 A | 1/1996 | Yamamori et al. | |
| 5,482,625 A | 1/1996 | Shimizu et al. | |
| 5,484,528 A | 1/1996 | Yagi et al. | |
| 5,490,939 A | 2/1996 | Gerigk et al. | |
| 5,491,023 A | 2/1996 | Tsai et al. | |
| 5,501,798 A | 3/1996 | Al-Samadi et al. | |
| 5,525,220 A | 6/1996 | Yagi et al. | |
| 5,531,848 A | 7/1996 | Brinda et al. | |
| 5,531,900 A | 7/1996 | Raghavan et al. | |
| 5,543,002 A | 8/1996 | Brinda et al. | |
| 5,552,047 A | 9/1996 | Oshida et al. | |
| 5,554,283 A | 9/1996 | Brinda et al. | |
| 5,556,591 A | 9/1996 | Jallerat et al. | |
| 5,575,963 A | 11/1996 | Soffer et al. | |
| 5,597,732 A | 1/1997 | Bryan-Brown | |
| 5,607,593 A * | 3/1997 | Cote et al. | 210/650 |
| 5,633,163 A | 5/1997 | Cameron | |
| 5,639,373 A * | 6/1997 | Mahendran et al. | 210/636 |
| 5,643,455 A * | 7/1997 | Kopp et al. | 210/636 |
| 5,647,988 A | 7/1997 | Kawanishi et al. | |
| 5,670,053 A | 9/1997 | Collentro et al. | |
| 5,677,360 A | 10/1997 | Yamamori et al. | |
| 5,688,460 A | 11/1997 | Ruschke | |
| 5,733,456 A | 3/1998 | Okey et al. | |
| 5,744,037 A | 4/1998 | Fujimura et al. | |
| 5,747,605 A | 5/1998 | Breant et al. | |
| 5,766,479 A | 6/1998 | Collentro et al. | |
| D396,046 S | 7/1998 | Scheel et al. | |
| 5,783,083 A * | 7/1998 | Henshaw et al. | 210/636 |
| D396,726 S | 8/1998 | Sadr et al. | |
| D400,890 S | 11/1998 | Gambardella | |
| 5,843,069 A | 12/1998 | Butler et al. | |
| 5,846,424 A | 12/1998 | Khudenko | |
| 5,871,823 A | 2/1999 | Anders et al. | |
| 5,888,401 A | 3/1999 | Nguyen | |
| 5,895,570 A | 4/1999 | Liang | |
| 5,906,739 A | 5/1999 | Osterland et al. | |
| 5,906,742 A | 5/1999 | Wang et al. | |
| 5,910,250 A * | 6/1999 | Mahendran et al. | 210/636 |
| 5,914,039 A | 6/1999 | Mahendran | |
| 5,918,264 A | 6/1999 | Drummond et al. | |
| 5,942,113 A | 8/1999 | Morimura | |
| 5,944,997 A | 8/1999 | Pedersen et al. | |
| 5,951,878 A | 9/1999 | Astrom | |
| 5,958,243 A | 9/1999 | Lawrence et al. | |
| 5,961,830 A | 10/1999 | Barnett | |
| 5,968,357 A | 10/1999 | Doelle et al. | |
| 5,988,400 A | 11/1999 | Karachevtcev et al. | |
| 5,989,428 A | 11/1999 | Goronszy | |
| 5,997,745 A | 12/1999 | Tonelli et al. | |
| 6,001,254 A | 12/1999 | Espenan | |
| 6,007,712 A | 12/1999 | Tanaka et al. | |
| 6,017,451 A | 1/2000 | Kopf | |
| 6,024,872 A | 2/2000 | Mahendran | |
| 6,036,030 A | 3/2000 | Stone et al. | |
| 6,039,872 A | 3/2000 | Wu et al. | |
| 6,042,677 A | 3/2000 | Mahendran et al. | |
| 6,045,698 A | 4/2000 | Cote et al. | |
| 6,045,899 A | 4/2000 | Wang et al. | |
| 6,048,454 A | 4/2000 | Jenkins | |
| 6,048,455 A | 4/2000 | Janik | |
| 6,066,401 A | 5/2000 | Stilburn | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |
| 6,113,782 A | 9/2000 | Leonard | |
| 6,120,688 A | 9/2000 | Daly et al. | |
| 6,126,819 A | 10/2000 | Heine et al. | |
| 6,146,747 A | 11/2000 | Wang et al. | |
| 6,149,817 A | 11/2000 | Peterson et al. | |
| 6,156,200 A * | 12/2000 | Zha et al. | 210/321.89 |
| 6,159,373 A | 12/2000 | Beck et al. | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,214,232 B1 | 4/2001 | Baurmeister et al. | |
| 6,221,247 B1 | 4/2001 | Nemser et al. | |
| 6,245,239 B1 | 6/2001 | Cote et al. | |
| 6,254,773 B1 | 7/2001 | Biltoft | |
| 6,264,839 B1 | 7/2001 | Mohr et al. | |
| 6,277,512 B1 | 8/2001 | Hamrock et al. | |
| 6,280,626 B1 | 8/2001 | Miyashita et al. | |
| 6,284,135 B1 | 9/2001 | Ookata | |
| 6,290,756 B1 | 9/2001 | Macheras et al. | |
| 6,294,039 B1 | 9/2001 | Mahendran et al. | |
| 6,299,773 B1 | 10/2001 | Takamura et al. | |
| 6,303,026 B1 | 10/2001 | Lindbo | |
| 6,303,035 B1 | 10/2001 | Cote et al. | |
| 6,315,895 B1 | 11/2001 | Summerton et al. | |
| 6,322,703 B1 | 11/2001 | Taniguchi et al. | |
| 6,325,928 B1 | 12/2001 | Pedersen et al. | |
| 6,325,938 B1 | 12/2001 | Miyashita et al. | |
| 6,337,018 B1 | 1/2002 | Mickols | |
| RE37,549 E | 2/2002 | Mahendran et al. | |
| 6,349,835 B1 | 2/2002 | Saux et al. | |
| 6,354,444 B1 | 3/2002 | Mahendran | |

| | | | |
|---|---|---|---|
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Gröschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 * | 4/2003 | Zha et al. ............... 210/636 |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,627,082 B2 | 9/2003 | Del Vecchio |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,189 B2 | 3/2004 | Rabie et al. |
| 6,708,957 B2 | 3/2004 | Guibert et al. |
| 6,712,970 B1 | 3/2004 | Trivedi |
| 6,721,529 B2 | 4/2004 | Chen et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,758,972 B2 | 7/2004 | Vriens et al. |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,841,070 B2 | 1/2005 | Zha et al. |
| 6,861,466 B2 | 3/2005 | Dadalas et al. |
| 6,863,817 B2 | 3/2005 | Liu et al. |
| 6,863,818 B2 | 3/2005 | Daigger et al. |
| 6,863,823 B2 | 3/2005 | Côté |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 * | 11/2005 | Zha et al. ............... 210/636 |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes et al. |
| 7,378,024 B2 | 5/2008 | Bartels et al. |
| 7,387,723 B2 | 6/2008 | Jordan |
| 7,404,896 B2 | 7/2008 | Muller et al. |
| 7,455,765 B2 | 11/2008 | Elefritz et al. |
| 7,481,933 B2 | 1/2009 | Barnes |
| 7,510,655 B2 | 3/2009 | Barnes |
| 7,563,363 B2 | 7/2009 | Kuzma |
| 7,591,950 B2 | 9/2009 | Zha et al. |
| 7,632,439 B2 | 12/2009 | Mullette et al. |
| 7,713,413 B2 | 5/2010 | Barnes |
| 7,718,057 B2 | 5/2010 | Jordan |
| 7,718,065 B2 | 5/2010 | Jordan |
| 7,722,769 B2 | 5/2010 | Jordan |
| 2001/0027951 A1 | 10/2001 | Gungerich et al. |
| 2001/0047962 A1 | 12/2001 | Zha et al. |
| 2001/0052494 A1 | 12/2001 | Cote et al. |
| 2002/0070157 A1 | 6/2002 | Yamada |
| 2002/0148767 A1 | 10/2002 | Johnson et al. |
| 2002/0153299 A1 | 10/2002 | Mahendran et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0057155 A1 | 3/2003 | Husain et al. |
| 2003/0075504 A1 | 4/2003 | Zha et al. |
| 2003/0089659 A1 | 5/2003 | Zha et al. |
| 2003/0121855 A1 | 7/2003 | Kopp |
| 2003/0127388 A1 | 7/2003 | Ando et al. |
| 2003/0136746 A1 | 7/2003 | Behmann et al. |
| 2003/0141248 A1 | 7/2003 | Mahendran et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0164332 A1 | 9/2003 | Mahendran et al. |
| 2003/0178365 A1 | 9/2003 | Zha et al. |
| 2003/0205519 A1 | 11/2003 | Zha et al. |
| 2003/0226797 A1 | 12/2003 | Phelps |
| 2003/0234221 A1 | 12/2003 | Johnson et al. |
| 2004/0000520 A1 | 1/2004 | Gallagher et al. |
| 2004/0007525 A1 | 1/2004 | Rabie et al. |
| 2004/0035770 A1 | 2/2004 | Edwards et al. |
| 2004/0035782 A1 | 2/2004 | Muller |
| 2004/0084369 A1 | 5/2004 | Zha et al. |
| 2004/0145076 A1 | 7/2004 | Zha et al. |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0191894 A1 | 9/2004 | Muller et al. |
| 2004/0217053 A1 | 11/2004 | Zha et al. |
| 2004/0232076 A1 | 11/2004 | Zha et al. |

| | | | | | | |
|---|---|---|---|---|---|---|
| 2004/0245174 A1 | 12/2004 | Takayama et al. | EP | 1659171 | | 5/2006 |
| 2005/0029185 A1 | 2/2005 | Muller | FR | 2620712 | | 3/1989 |
| 2005/0029186 A1 | 2/2005 | Muller | FR | 2674448 | A1 | 2/1992 |
| 2005/0032982 A1 | 2/2005 | Muller et al. | FR | 2699424 | | 6/1994 |
| 2005/0045557 A1 | 3/2005 | Daigger et al. | FR | 2762834 | A | 11/1998 |
| 2005/0061725 A1 | 3/2005 | Liu et al. | GB | 702911 | | 1/1954 |
| 2005/0087898 A1 | 4/2005 | Cox et al. | GB | 2253572 | A | 9/1992 |
| 2005/0098494 A1 | 5/2005 | Mullette et al. | JP | 54-162684 | | 12/1979 |
| 2005/0103722 A1 | 5/2005 | Freydina et al. | JP | 55-129155 | | 6/1980 |
| 2005/0109692 A1 | 5/2005 | Zha et al. | JP | 55-099703 | | 7/1980 |
| 2005/0115880 A1 | 6/2005 | Pollock | JP | 55-129107 | | 10/1980 |
| 2005/0115899 A1 | 6/2005 | Liu et al. | JP | 56-021604 | | 2/1981 |
| 2005/0139538 A1 | 6/2005 | Lazaredes | JP | 56-118701 | | 9/1981 |
| 2005/0194310 A1 | 9/2005 | Yamamoto et al. | JP | 56-121685 | | 9/1981 |
| 2005/0194315 A1 | 9/2005 | Adams et al. | JP | 57-190697 | | 11/1982 |
| 2006/0000775 A1 | 1/2006 | Zha et al. | JP | 58-088007 | A2 | 5/1983 |
| 2006/0081533 A1 | 4/2006 | Khudenko | JP | 60-019002 | | 1/1985 |
| 2006/0131234 A1 | 6/2006 | Zha et al. | JP | 60-206412 | | 10/1985 |
| 2006/0201876 A1 | 9/2006 | Jordan | JP | 60-260628 | | 12/1985 |
| 2006/0249448 A1 | 11/2006 | Fujishima et al. | JP | 61-097005 | | 5/1986 |
| 2006/0249449 A1 | 11/2006 | Nakhla et al. | JP | 61-097006 | A2 | 5/1986 |
| 2006/0261007 A1 | 11/2006 | Zha et al. | JP | 61-107905 | A2 | 5/1986 |
| 2006/0273007 A1 | 12/2006 | Zha et al. | JP | 61-167406 | | 7/1986 |
| 2006/0273038 A1 | 12/2006 | Syed et al. | JP | 61-167407 | | 7/1986 |
| 2007/0007205 A1 | 1/2007 | Johnson et al. | JP | S6338884 | | 7/1986 |
| 2007/0007214 A1 | 1/2007 | Zha et al. | JP | 61-171504 | | 8/1986 |
| 2007/0045183 A1 | 3/2007 | Murphy | JP | 61-192309 | A * | 8/1986 |
| 2007/0056905 A1 | 3/2007 | Beck et al. | JP | 61-222510 | | 10/1986 |
| 2007/0075017 A1 | 4/2007 | Kuzma | JP | 61-242607 | | 10/1986 |
| 2007/0075021 A1 | 4/2007 | Johnson | JP | 61-249505 | | 11/1986 |
| 2007/0084791 A1 | 4/2007 | Jordan et al. | JP | 61-257203 | A2 | 11/1986 |
| 2007/0084795 A1 | 4/2007 | Jordan | JP | 61-263605 | A2 | 11/1986 |
| 2007/0108125 A1 | 5/2007 | Cho et al. | JP | 61-291007 | | 12/1986 |
| 2007/0138090 A1 | 6/2007 | Jordan et al. | JP | 61-293504 | | 12/1986 |
| 2007/0170112 A1 | 7/2007 | Elefritz et al. | JP | 62-004408 | A2 | 1/1987 |
| 2007/0227973 A1 | 10/2007 | Zha et al. | JP | 62-068828 | | 3/1987 |
| 2008/0053923 A1 | 3/2008 | Beck et al. | JP | 62-114609 | A2 | 5/1987 |
| | | | JP | 62-140607 | A2 | 6/1987 |
| | FOREIGN PATENT DOCUMENTS | | JP | 62-144708 | | 6/1987 |
| | | | JP | 62-163708 | | 7/1987 |
| AU | 55847/86 | 3/1985 | JP | 62-179540 | A2 | 8/1987 |
| AU | 77066/87 | 7/1986 | JP | 62-237908 | | 10/1987 |
| AU | 762091 B2 | 11/2000 | JP | 62-250908 | | 10/1987 |
| CN | 1050770 C | 1/1995 | JP | 62-262710 | | 11/1987 |
| CN | 1249698 A | 4/2000 | JP | 63-097634 | A2 | 4/1988 |
| CN | 1541757 A | 11/2004 | JP | 63-099246 | | 4/1988 |
| DE | 3904544 A1 | 8/1990 | JP | 63-143905 | A2 | 6/1988 |
| DE | 4117281 A1 | 1/1992 | JP | 63-171607 | | 7/1988 |
| DE | 4113420 A1 | 10/1992 | JP | 63-180254 | | 7/1988 |
| DE | 4117422 A | 11/1992 | JP | 01-075542 | | 3/1989 |
| DE | 29804927 U1 | 6/1998 | JP | 06-027215 | | 3/1989 |
| DE | 29906389 | 6/1999 | JP | 01-151906 | | 6/1989 |
| EP | 194735 | 9/1876 | JP | 01 307409 | A2 | 12/1989 |
| EP | 012557 B1 | 2/1983 | JP | 02-026625 | | 1/1990 |
| EP | 126714 A2 | 11/1984 | JP | 02-031200 | | 2/1990 |
| EP | 050447 B1 | 10/1985 | JP | 02-040296 | A | 2/1990 |
| EP | 250337 A1 | 12/1987 | JP | 02-107318 | | 4/1990 |
| EP | 327025 A1 | 8/1989 | JP | 02-126922 | | 5/1990 |
| EP | 090383 B1 | 5/1990 | JP | 02-144132 | | 6/1990 |
| EP | 407900 A2 | 1/1991 | JP | 02-164423 | A2 | 6/1990 |
| EP | 492942 A2 | 7/1992 | JP | 02-241523 | | 9/1990 |
| EP | 518250 B1 | 12/1992 | JP | 02-277528 | | 11/1990 |
| EP | 547575 A1 | 6/1993 | JP | 02-284035 | A2 | 11/1990 |
| EP | 395133 B1 | 2/1995 | JP | 03-018373 | A2 | 1/1991 |
| EP | 463627 B1 | 5/1995 | JP | 03-028797 | A2 | 2/1991 |
| EP | 662341 A1 | 7/1995 | JP | 03-110445 | | 5/1991 |
| EP | 492446 B1 | 11/1995 | JP | 04-108518 | | 4/1992 |
| EP | 430082 B1 | 6/1996 | JP | 04-110023 | | 4/1992 |
| EP | 734758 A1 | 10/1996 | JP | 04-187224 | | 7/1992 |
| EP | 763758 A1 | 10/1996 | JP | 04-250898 | | 9/1992 |
| EP | 824956 A2 | 2/1998 | JP | 04-256424 | | 9/1992 |
| EP | 855214 A1 | 7/1998 | JP | 04-265128 | | 9/1992 |
| EP | 0 627 255 B1 | 1/1999 | JP | 04-293527 | | 10/1992 |
| EP | 911073 A1 | 4/1999 | JP | 04-310223 | A2 | 11/1992 |
| EP | 920904 A2 | 6/1999 | JP | 04-334530 | | 11/1992 |
| EP | 1 034 835 | 9/2000 | JP | 04-348252 | | 12/1992 |
| EP | 1052012 A1 | 11/2000 | JP | 05-023557 | A2 | 2/1993 |
| EP | 1349644 | 10/2003 | JP | 05-096136 | | 4/1993 |
| EP | 1350555 A1 | 10/2003 | JP | 05-137977 | | 6/1993 |
| EP | 1236503 B1 | 8/2004 | | | | |

| | | |
|---|---|---|
| JP | 05-157654 A2 | 6/1993 |
| JP | 05-161831 | 6/1993 |
| JP | 05-285348 | 11/1993 |
| JP | 06-071120 A2 | 3/1994 |
| JP | 06-114240 A2 | 4/1994 |
| JP | 06-218237 | 8/1994 |
| JP | 06-277469 | 10/1994 |
| JP | 06-285496 | 10/1994 |
| JP | 06-343837 A2 | 12/1994 |
| JP | 07-000770 A2 | 1/1995 |
| JP | 07-024272 | 1/1995 |
| JP | 07-047247 | 2/1995 |
| JP | 07-068139 | 3/1995 |
| JP | 07-136470 | 5/1995 |
| JP | 07-136471 | 5/1995 |
| JP | 07-155564 | 6/1995 |
| JP | 07-155758 | 6/1995 |
| JP | 07-178323 | 7/1995 |
| JP | 07-185268 A2 | 7/1995 |
| JP | 07-185270 | 7/1995 |
| JP | 07-185271 | 7/1995 |
| JP | 07-185272 | 7/1995 |
| JP | 07-236819 | 9/1995 |
| JP | 07-251043 | 10/1995 |
| JP | 07-275665 A2 | 10/1995 |
| JP | 07-289860 | 11/1995 |
| JP | 07-303895 | 11/1995 |
| JP | 08-010585 A2 | 1/1996 |
| JP | 09-072993 | 3/1997 |
| JP | 09-099227 | 4/1997 |
| JP | 09-141063 A2 | 6/1997 |
| JP | 09-155345 | 6/1997 |
| JP | 09-187628 | 7/1997 |
| JP | 09-220569 | 8/1997 |
| JP | 09-271641 | 10/1997 |
| JP | 09-324067 | 12/1997 |
| JP | 10-024222 | 1/1998 |
| JP | 10-033955 | 2/1998 |
| JP | 10-048466 | 2/1998 |
| JP | 10-076264 | 3/1998 |
| JP | 10-085565 | 4/1998 |
| JP | 10-156149 A2 | 6/1998 |
| JP | 10-180048 | 7/1998 |
| JP | 11-005023 | 1/1999 |
| JP | 11-028467 | 2/1999 |
| JP | 11-076769 | 3/1999 |
| JP | 11-156166 | 6/1999 |
| JP | 11-165200 | 6/1999 |
| JP | 11-333265 | 7/1999 |
| JP | 11-033365 | 9/1999 |
| JP | 11-033367 | 9/1999 |
| JP | 11-302438 | 11/1999 |
| JP | 11-319507 | 11/1999 |
| JP | 2000-000439 | 1/2000 |
| JP | 2000-070684 | 3/2000 |
| JP | 2000-185220 | 4/2000 |
| JP | 2000-157850 | 6/2000 |
| JP | 2000-233020 | 8/2000 |
| JP | 2000-237548 | 9/2000 |
| JP | 2000-300968 | 10/2000 |
| JP | 2000-317276 | 11/2000 |
| JP | 2001-009246 | 1/2001 |
| JP | 2001-070967 | 3/2001 |
| JP | 2001-079366 | 3/2001 |
| JP | 2001-079367 | 3/2001 |
| JP | 2001-104760 | 4/2001 |
| JP | 2001-179059 | 7/2001 |
| JP | 2001-190937 | 7/2001 |
| JP | 2001-190938 | 7/2001 |
| JP | 2001-205055 | 7/2001 |
| JP | 2000-342932 | 12/2002 |
| JP | 2003-047830 | 2/2003 |
| JP | 2003-053160 | 2/2003 |
| JP | 2003-062436 | 3/2003 |
| JP | 2003-135935 | 5/2003 |
| JP | 2004-230280 | 8/2004 |
| JP | 05-279447 A | 10/2005 |
| JP | 2005-279447 | 10/2005 |
| JP | 09-192458 | 7/2007 |
| JP | 07-313973 | 5/2010 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1020491 C | 10/2003 |
| NL | 1021197 C | 10/2003 |
| TW | 347343 | 12/1998 |
| WO | WO 88-00494 | 1/1988 |
| WO | WO 88-06200 | 8/1988 |
| WO | WO 89/00880 A1 | 2/1989 |
| WO | WO 90/00434 | 1/1990 |
| WO | WO 91-04783 | 4/1991 |
| WO | WO 91-16124 | 10/1991 |
| WO | WO 93/02779 A1 | 2/1993 |
| WO | WO 93/15827 | 8/1993 |
| WO | WO 93-23152 | 11/1993 |
| WO | WO 94-11094 | 5/1994 |
| WO | WO 95-34424 | 12/1995 |
| WO | WO 96/07470 * | 3/1996 |
| WO | WO 96/07470 A1 | 3/1996 |
| WO | WO 96-28236 | 9/1996 |
| WO | WO 96-41676 | 12/1996 |
| WO | WO 97/06880 * | 2/1997 |
| WO | WO 97/06880 A2 | 2/1997 |
| WO | WO 98/22204 A1 | 5/1998 |
| WO | WO 98-25694 | 6/1998 |
| WO | WO 98/28066 * | 7/1998 |
| WO | WO 98-53902 | 12/1998 |
| WO | WO 99-01207 | 1/1999 |
| WO | WO 99/59707 | 11/1999 |
| WO | WO 00-18498 | 4/2000 |
| WO | WO 00-30742 | 6/2000 |
| WO | WO 01-00307 | 1/2001 |
| WO | WO 01-19414 A1 | 3/2001 |
| WO | WO 01-32299 | 5/2001 |
| WO | WO 01/36075 A1 | 5/2001 |
| WO | WO 01-45829 A1 | 6/2001 |
| WO | WO 02-40140 A1 | 5/2002 |
| WO | WO 03-000389 A2 | 1/2003 |
| WO | WO 03-013706 A1 | 2/2003 |
| WO | WO 03-057632 A1 | 7/2003 |
| WO | WO 03-059495 | 7/2003 |
| WO | WO 03-068374 A1 | 8/2003 |
| WO | WO 2004-101120 A1 | 11/2004 |
| WO | WO 2005-005028 A1 | 1/2005 |
| WO | WO 2005-021140 A1 | 3/2005 |
| WO | WO 2005-028086 A1 | 3/2005 |
| WO | WO 2005/037414 A1 | 4/2005 |
| WO | WO 2005-077499 A1 | 8/2005 |
| WO | WO 2005-107929 A | 11/2005 |
| WO | WO 2006-029456 A1 | 3/2006 |
| WO | WO 2006-047814 A1 | 5/2006 |

OTHER PUBLICATIONS

Almulla et al., *Desalination*, 153 (2002), pp. 237-243.
Cote et al., *Wat. Sci. Tech.* 38(4-5) (1998), pp. 437-442.
Johnson, "Recent Advances in Microfiltration for Drinking Water Treatment," AWWA Annual Conference, Jun. 20-24, 1999, Chicago, Illinois, entire publication.
Kaiya et al., "Water Purification Using Hollow Fiber Microfiltration Membranes," 6th World Filtration Congress, Nagoya, 1993, pp. 813-816.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Rosenberger et al., *Desalination*, 151 (2002), pp. 195-200.
Ueda et al., "Effects of Aeration on Suction Pressure in a Submerged Membrane Bioreactor," *Wat. Res.* vol. 31, No. 3, 1997, pp. 489-494.
Zenon, "Proposal for ZeeWeed® Membrane Filtration Equipment System for the City of Westminster, Colorado, Proposal No. 479-99," Mar. 2000, entire publication.
Anonymous, *"Nonwoven Constructions of Dyneon™ THV and Dyneon™ THE Fluorothermoplastics"*, Research Disclosure Journal, Apr. 1999, RD 420013, 2 pages.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., $2^{nd}$ Intl. Meeting; School of Water Sciences, Cranfield University, Cranfield, UK, Jun. 1999.

Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

*Water Encyclopedia*, edited by Jay Lehr, published by John Wiley & Sons, Inc., Hoboken, New Jersey, 2005. Available at http://wwwm-mrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

Craig, Jones, "Applications of Hydrogen Peroxide and Derivatives," The Royal Society of Chemistry, Cambridge, UK 1999 Chapters 2 and 5.

Kang et al. "Characteristics of microfiltration membranes in a membrane coupled sequencing batch reactor system" Water Research, Elsevier, Amsterdam, NL, vol. 37, No. 5, Mar. 2003.

MicroC™—Carbon Source for Wastewater Denitrification. Information from Environmental Operating Solutions website including MSDS.

U.S. Appl. No. 60/278,007, filed Mar. 23, 2001.

Yamamoto et al., Water Science Technology, vol. 2, pp. 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Official Action issued Mar. 9, 2010 for Japanese Patent Application No. 528141/1998.

\* cited by examiner

SCOURING METHOD

RELATED APPLICATIONS

This application is a continuation of application Ser. No. 10/805,608, filed Mar. 19, 2004 now abandoned, which is a continuation of application Ser. No. 10/674,694, filed Sep. 30, 2003 now abandoned, which is a continuation of application Ser. No. 10/369,813, filed Feb. 18, 2003 now abandoned, which is a continuation of application Ser. No. 09/336,059, filed Jun. 18, 1999 and now U.S. Pat. No. 6,555,005, which is a continuation, under 35 U.S.C. §120, of International Patent Application No. PCT/AU97/00855, filed on Dec. 18, 1997 under the Patent Cooperation Treaty (PCT), which was published by the International Bureau in English on Jul. 2, 1998, which designates the U.S. and claims the benefit of Australian Provisional Patent Application No. PO 4312, filed Dec. 20, 1996 and Australian Provisional Patent Application No. PO 8918, filed Sep. 1, 1997, all of which are hereby incorporated by reference.

FIELD OF THE INVENTION

The present invention relates to the use of a gas bubble system to remove fouling materials from the surface of membranes used in filtration systems and the like.

BACKGROUND OF THE INVENTION

A variety of membrane filtration systems are known and many of these use pressurised systems operating at high transmembrane pressures (TMP) to produce effective filtering and high filtrate flux. These systems are highly effective but are also expensive to produce, operate and maintain. Simpler systems using membrane arrays freely mounted vertically in a tank and using suction applied to the fibre lumens to produce TMP have also been developed, however, these systems have been found in the past to be less effective than the pressurised systems.

Examples of such known systems are illustrated in U.S. Pat. No. 5,192,456 to Ishida et al, U.S. Pat. No. 5,248,424 to Cote et al and WO 97/06880 to Zenon Environmental Inc.

The Ishida et al patent describes an activated sludge treating apparatus where air flow is used to clean the outer surface of the filter membrane. In this arrangement the air blower used for biological treatment of the waste water is also used as a secondary agitation source to clean the surface of the membranes. The membrane modules are of the plate type. The membranes also have a low packing density and thus do not have the problems associated with cleaning tightly packed fibre bundles. Air is bubbled from beneath the modules and is supplied externally from the membrane array.

The Cote et al patent again describes a system of cleaning arrays of fibres. In this case the fibres are mounted in a skein to form an inverted U-shaped or parabolic array and the air is introduced below the array to produce bubbles which contact the fibres with such force they keep the surfaces relatively free of attached microorganisms and deposits of inanimate particles. The fibres are freely swayable as they are only attached at either end and this assists removal of deposits on their outer surface. The bubbles of gas/air flow are provided from a source external of the fibre bundle and move generally transverse to the lengths of fibre. This limits the depth of fibre bundle which can be effectively cleaned.

The invention disclosed in the Zenon Environmental, Inc. PCT Application No. WO 97/06880 is closely related to the Cote et al patent. In this document the fibres are unconfined, vertically arranged and dimensioned to be slightly longer than the distance between the opposed faces of the headers into which the fibre ends are mounted to allow for swaying and independent movement of the individual fibres. The skein is aerated with a gas distribution means which produces a mass of bubbles which serve to scrub the outer surface of the vertically arranged fibres as they rise upwardly through the skein.

Our own International Patent Application WO96/07470 describes an earlier method of cleaning membranes using a gas backwash to dislodge material from the membrane walls by applying a gas pressure to the filtrate side of the membranes and then rapidly decompressing the shell surrounding the feed side of the membranes. Feed is supplied to the shell while this gas backwash is taking place to cause turbulence and frothing around the membrane walls resulting in further dislodgment of accumulated solids.

SUMMARY OF THE INVENTION

The present invention relates particularly to a plurality of porous membranes arranged to form a membrane module arranged in a relatively tightly packed bundle. These porous membranes may be in the form of fibres or plate type membranes as described in the above prior art.

The present invention seeks to overcome or at least ameliorate the problems of the prior art by providing a simple effective system and method for removing fouling materials from the surface of the porous membranes by use of gas bubbles.

According to one aspect, the present invention provides a method of removing fouling materials from the surface of a plurality of porous membranes arranged in a membrane module, the porous membranes forming an array, the module having a header used to mount the membranes, the header connected to a source of pressurized gas, the method comprising providing, through the header, gas bubbles in a uniform distribution relative to the porous membrane array such that said bubbles move past the surfaces of said membranes to dislodge fouling materials therefrom, said membranes being arranged in close proximity to one another and mounted to prevent excessive movement therebetween. The porous membranes may comprise hollow fibre membranes. Preferably, the fibre membranes are arranged in bundles surrounded by a perforated cage which serves to prevent said excessive movement therebetween.

According to a second aspect, the present invention provides a membrane module comprising a plurality of porous membranes, said membranes being arranged in close proximity to one another and mounted to prevent excessive movement therebetween, the membranes forming an array, the module having a header used to mount the membranes, the header connected to a source of pressurized gas so as to permit formation of gas bubbles such that, in use, said gas moves through said header, and said bubbles move past the surfaces of said membranes to dislodge fouling materials therefrom.

The gas bubbles may be provided from within the module by a variety of methods including gas distribution holes or openings in the header, a porous tube located within the module or a tube or tubes positioned to output gas within the module, the tubes may be in the form of a comb of tubes containing holes which sit within the module. Another method of providing gas bubbles includes creating gas in-situ by means of spark type ozone generators or the like. Further types of gas provision are detailed below and in the preferred embodiments of the invention.

According to one preferred form, the present invention provides a method of removing fouling materials from the surface of a plurality of porous hollow fibre membranes mounted and extending longitudinally in an array to form a membrane module, said membranes being arranged in close proximity to one another and mounted to prevent excessive movement therebetween, the method comprising the steps of providing, from within said array, via the header connected to a source of pressurized gas, uniformly distributed gas bubbles, said distribution being such that said bubbles pass substantially uniformly between each membrane in said array to scour the surface of said membranes and remove accumulated solids from within the membrane module.

For preference, said membranes are mounted vertically to form said array and said bubbles pass generally parallel to the longitudinal extent of said fibres. Preferably, said uniformly distributed gas bubbles are provided at the lower end of the array. Optionally, a backwash may be used in conjunction with the removal process to assist solids removal from the membrane pores and outer surface of the membranes.

For preference, the membranes comprise porous hollow fibres, the fibres being fixed at each end in a header, the lower header having a plurality of holes formed therein through which gas is introduced to provide the gas bubbles. The fibres are normally sealed at the lower end and open at their upper end to allow removal of filtrate. Some of the fibres may also be used to provide bubbles of scouring gas to the array by feeding gas through selected ones of the fibres in the array. The fibres are preferably arranged in cylindrical arrays or bundles.

Filtrate is normally withdrawn from the fibres by application of suction applied thereto, however, it will be appreciated that any suitable means of providing TMP may be used. A porous sheet may be used in conjunction with the holes or separately to provide a more uniform distribution of gas bubbles. The porous sheet also provides the added advantage of preventing solids ingressing into the air supply plenum chamber.

According to a further preferred aspect, the present invention provides a membrane module comprising a plurality of porous hollow membrane fibres extending longitudinally between and mounted at each end to a respective potting head, said membrane fibres being arranged in close proximity to one another and mounted to prevent excessive movement therebetween, one of said potting heads having a uniform distributed array of aeration holes formed therein and said fibres being substantially uniformly mounted in said one potting head relative to said aeration holes.

According to a preferred further aspect, the present invention provides a filtration system including a membrane module according to said second aspect wherein said filter module is positioned vertically in a tank containing feed liquid to be filtered, means to apply a transmembrane pressure to said fibres in said array to cause filtrate to pass through pores in said fibres and means to supply continually or intermittently a supply of pressurized gas to said aeration holes so as to produce gas bubbles which move upwardly and uniformly between said fibres to scour the outer surfaces thereof.

Optionally, when the module is contained in a separate vessel, periodic draindown of the vessel is carried out after the scouring step to remove solids accumulated during the scouring process. Apart from draindown, other methods can be used for accumulated solids removal. These include continual bleed off of concentrated feed during the filtration cycle or overflow at the top of the tank by pumping feed into the base of the tank at regular intervals at a rate sufficient to cause overflow and removal of accumulated solids. This would be typically done at the end of a backwash cycle.

It should be understood that the term "gas" used herein includes any gas, including air and mixtures of gases as well as ozone and the like.

It will be appreciated that the above described invention may be readily applied to our own modular microporous filter cartridges as used in our continuous microfiltration systems and described in our earlier U.S. Pat. No. 5,405,528. These cartridges may be modified by providing gas distribution holes in the lower plug and providing a manifold for supplying gas to said holes such that, in use, the gas passes through the holes and forms scouring bubbles which pass upward through the filter medium. In a preferred arrangement, the filter medium would be sealed at the lower end and filtrate withdrawn under a vacuum from the upper end while the cartridge or cartridges were positioned in a tank containing the feed.

The embodiments of the invention will be described in relation to microporous fibre membranes, however, it will be appreciated that the invention is equally applicable to any form of membrane module.

BRIEF DESCRIPTION OF THE DRAWINGS

Preferred embodiments of the present invention will now be described, by way of example only, with reference to the accompanying drawings in which:—

DETAILED DESCRIPTION OF THE PREFERRED EMBODIMENT

Figure 1:
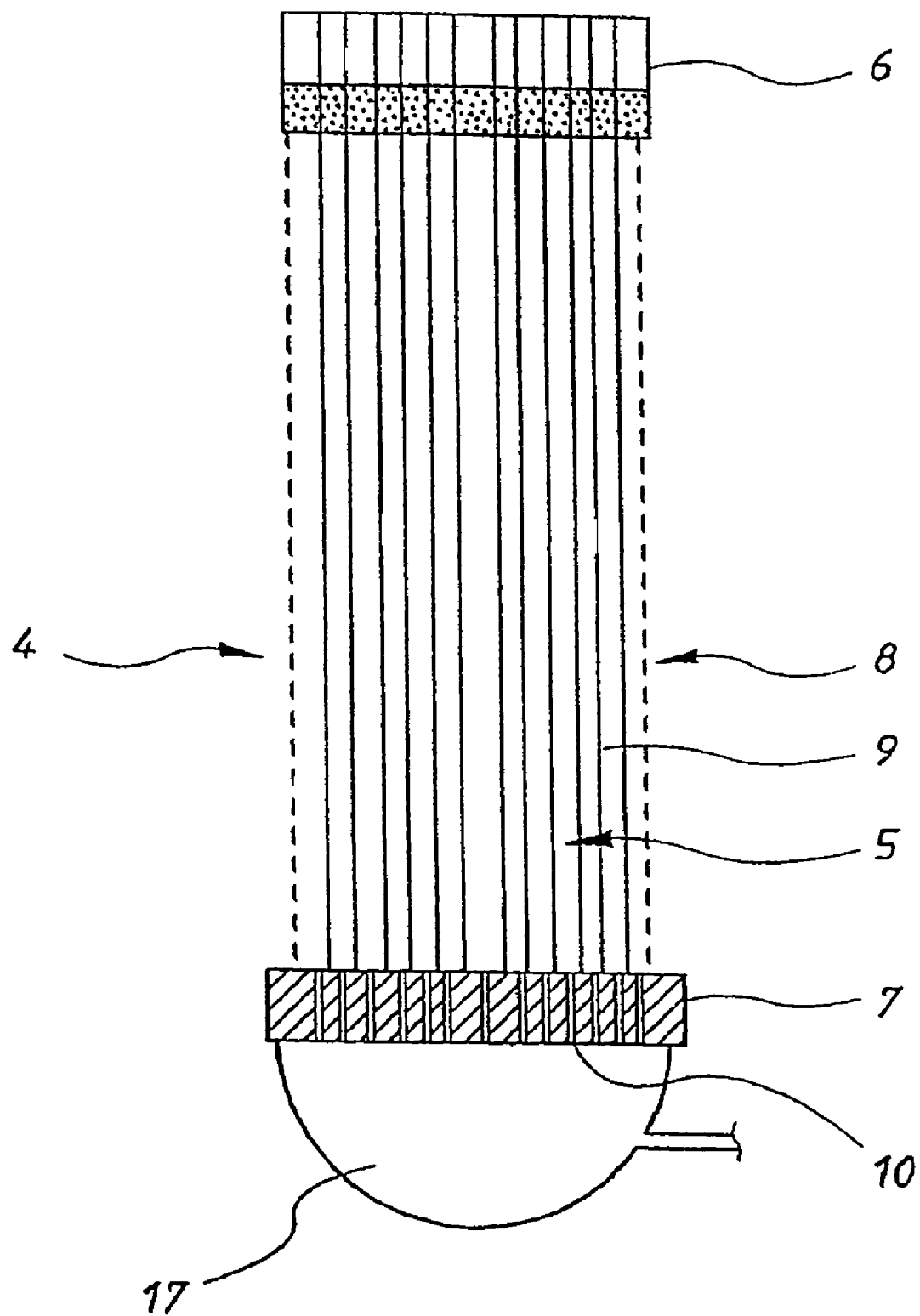
FIG. 1 shows a simplified cross-sectional view of one embodiment of a membrane module in accordance with the present invention.

Referring to FIG. 1, the membrane module 4, according to this embodiment, comprises a cylindrical array or bundle of hollow fibre membranes 5 extending longitudinally between upper and lower potting heads 6, 7. Optionally, a screen or cage 8 surrounds the array 5 and serves to hold the fibres 9 in close proximity to each other and prevent excessive movement. The fibres 9 are open at the upper potting head 6 to allow for filtrate removal from their lumens and sealed at the lower potting head 7. The lower potting head 7 has a number of holes 10 uniformly distributed therein to enable gas/air to be supplied therethrough. The fibres are fixed uniformly within the potting heads 6 and 7 and the holes 10 are formed uniformly relative to each fibre 9 so as to provide, in use, a uniform distribution of gas bubbles between the fibres.

The holes are formed as part of the potting process as described below. The arrangement of the holes relative to one another as well as the arrangement of fibres relative to the holes and each other has been found to effect the scouring efficiency of the gas bubbles.

The maldistribution of gas within the fibre bundle can be overcome by appropriate distribution and sizing of holes to ensure that bubble flow around the fibres is uniform across the bundle. In a cylindrical bundle of closely packed fibres it has been found that the distance traveled through the bundle by bubbles introduced towards the centre of the bundle is larger than those introduced towards the outer extremity of the bundle, resulting in a higher resistance to bubble flow at the centre of the bundle than at its border or periphery.

As outlined above, one method of addressing the maldistribution of gas bubbles is to provide a porous sheet (not shown) across the holes to provide an even pore distribution and thus a uniform gas flow. Another method is to provide a distribution of hole size relative to the distribution of resistance. Since the gas flowrate (Q) per unit area (A) is inversely proportional to the resistance (R), $$Q/A \sim 1/R$$

the relationship between the hole diameter (d) and the resistance becomes $$d \sim (R)^{1/2}$$

using the above relationship it is possible to design a hole size and position configuration which compensates for resistance differences within the bundle. For example, if the resistance at the centre of the bundle is 50% higher than that at its periphery, the hole size at the centre ($d_c$) and on the periphery ($d_p$) would be the following for a uniform distribution of gas:

$$d_c/d_p = 1.5^{0.5} = 1.22$$

Known methods of forming holes require the drilling of holes or other forms of post-potting formation. Such methods have the disadvantage of requiring avoidance of the fibres/membranes when drilling or the like to avoid damage. This imposes limitations on the fibre packing density and hole size as, where fibres are tightly packed, it very difficult to drill holes without interfering with or damaging the fibres. Further, it is difficult to accurately locate holes relative to the fibres/membranes.

The process used in one aspect of the present invention seeks to overcome or at least the ameliorate the problems and disadvantages outlined above.

According to this aspect, the present invention provides a method of forming openings in a membrane pot for use in gas distribution comprising the steps of: providing a mould for potting membrane ends, said mould having provided therein formations for forming said openings during the potting process; positioning said membrane ends in said mould which is filled with a curable potting material; allowing said potting material to at least partially cure and, demoulding said membranes.

Preferably, said membranes ends are uniformly distributed in relation to said formations. In another aspect, the invention includes a membrane assembly including at least one membrane pot formed according to the above method.

Figure 2:
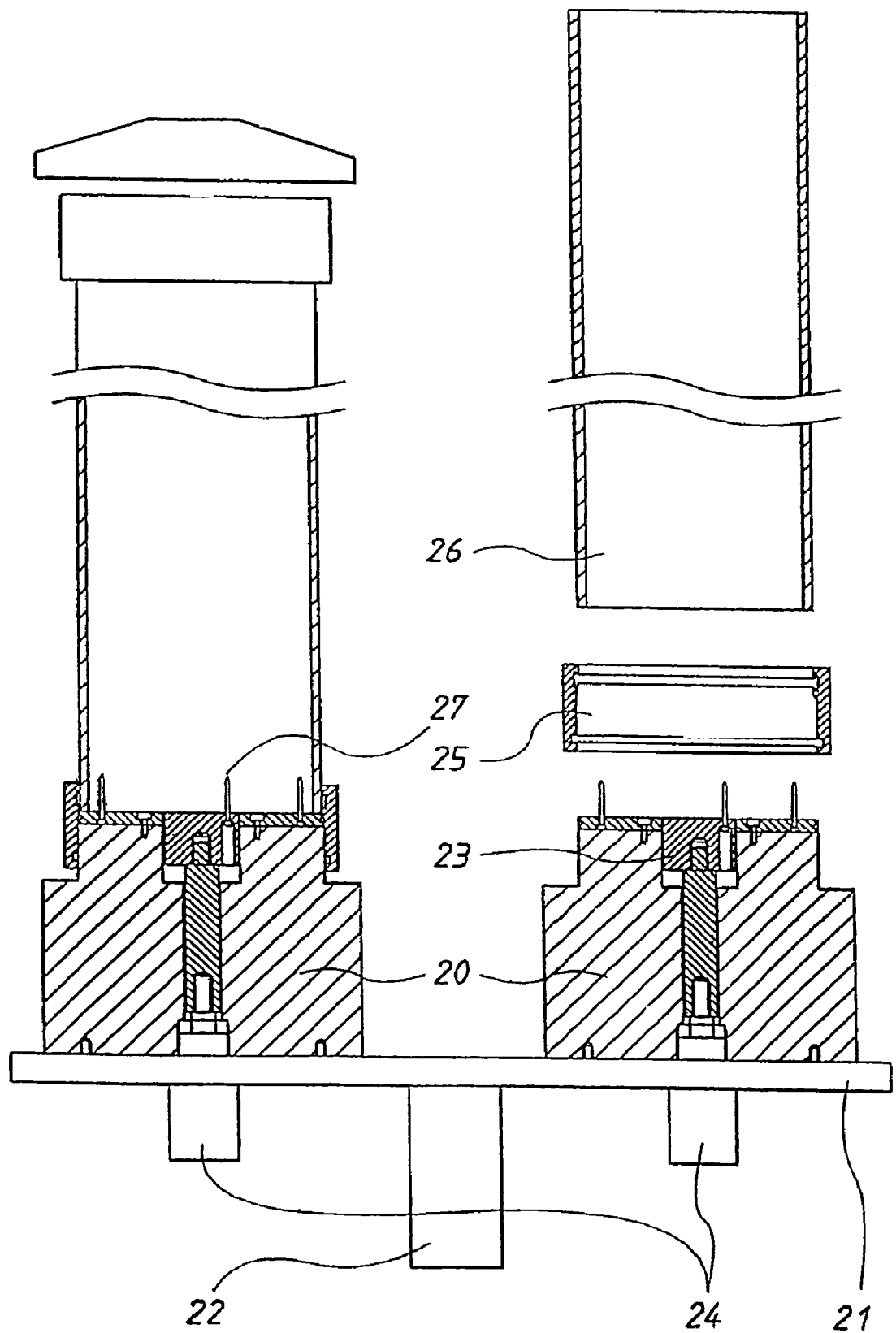
FIG. 2 shows a simplified two part representation of the potting arrangement of the membrane module according to one preferred form of the invention.
Figure 3:
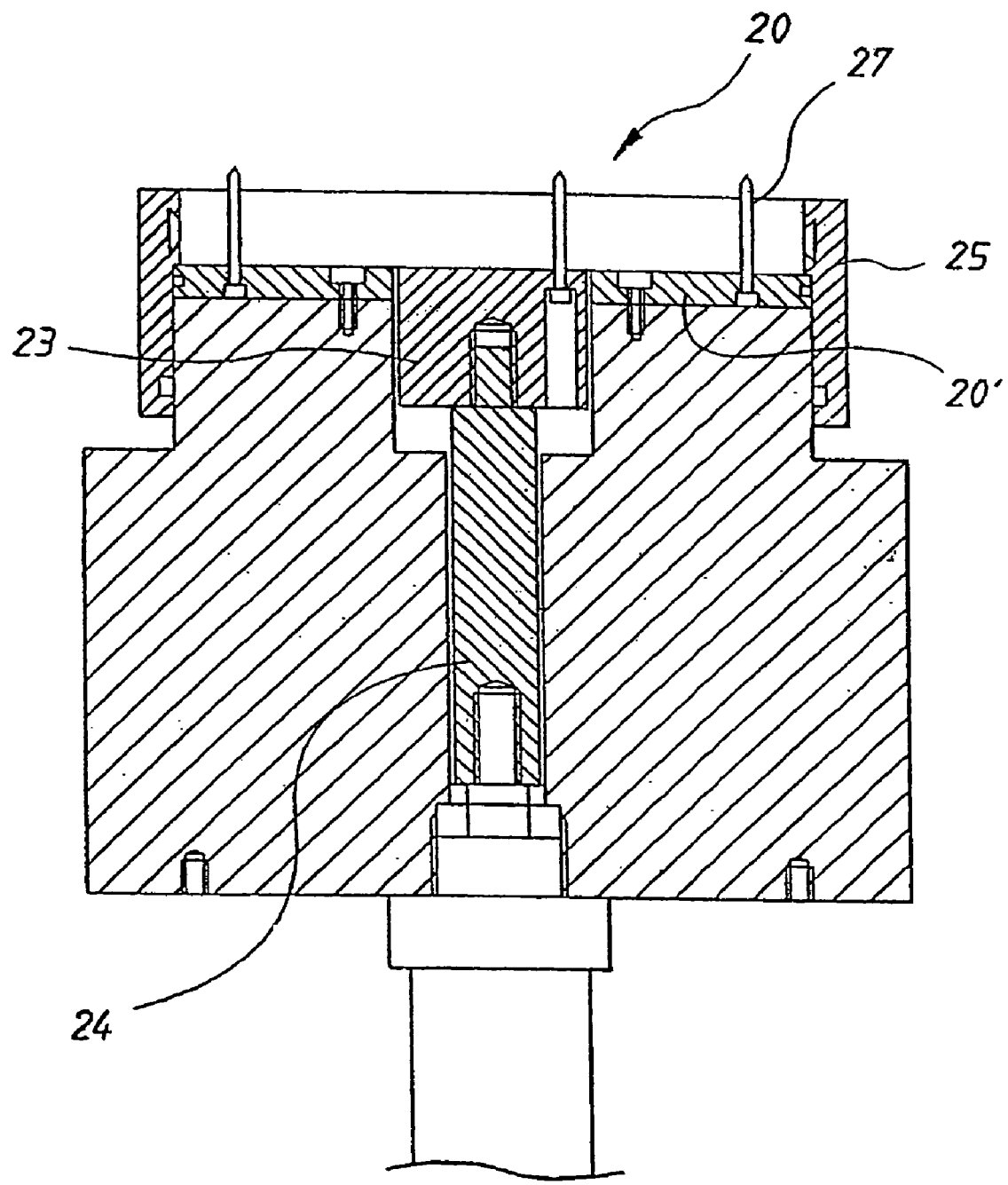
FIG. 3 shows an enlarged view of the potting base of FIG. 2.
Figure 4A:
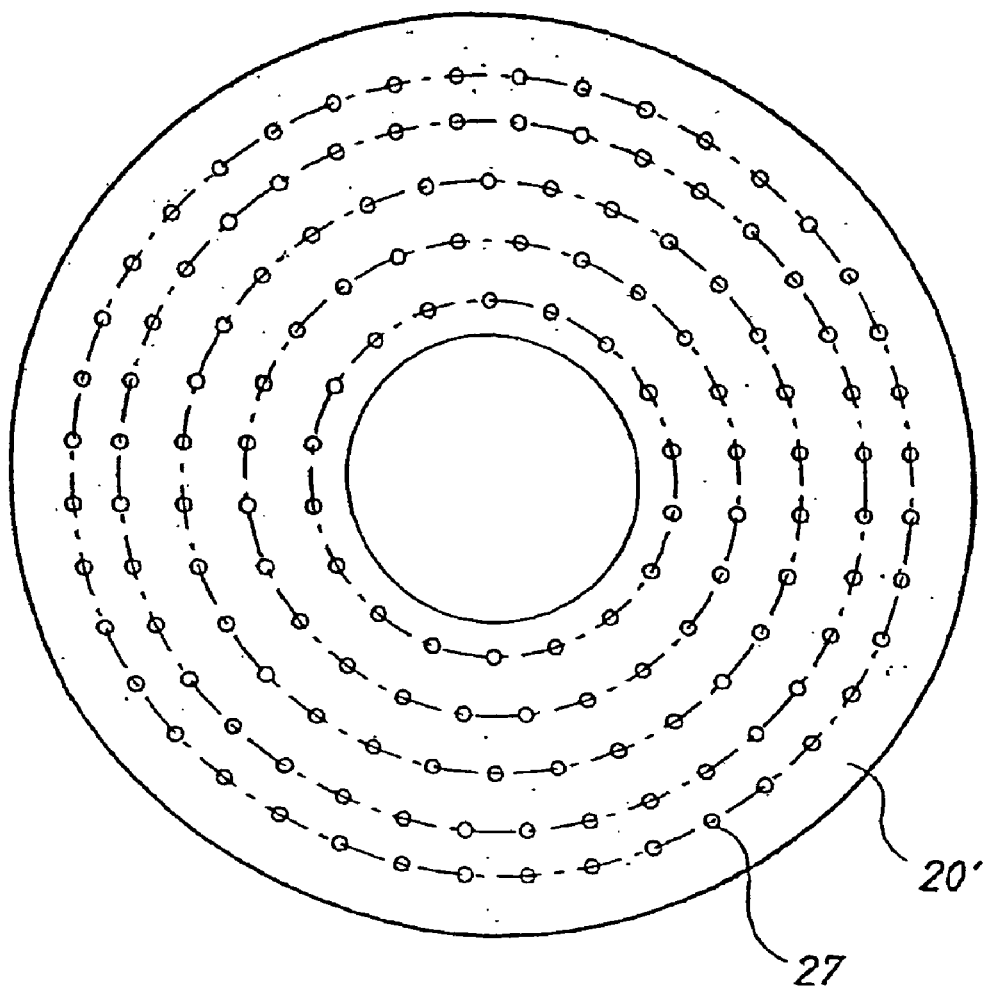
FIGS. 4A and 4B show the pin formations in the annular portion of the potting base and the plunger portion of the potting base, respectively.
Figure 4B:
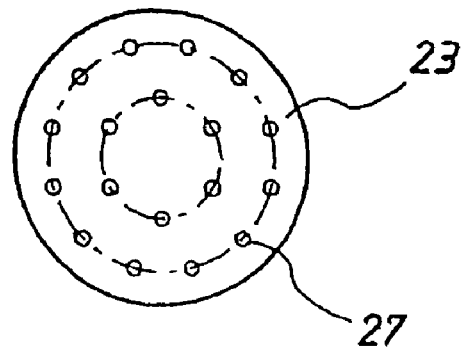

Referring to FIGS. 2-4, the preferred method of forming the gas distribution holes will be described. As shown in the right side part of FIG. 2, the potting apparatus (shown empty) comprises a potting mould 20 mounted on a vertically movable platform 21 which is raised and lowered by means of hydraulic cylinder 22. The centre of each mould 20 is provided with a vertically movable ejector plunger 23 operated by and hydraulic ejector cylinder 24. A fibre guide or collar 25 fits around the periphery of the mould to guide and hold the fibre ends during the potting process as well as retaining the potting mixture, typically polyurethane, within the mould. The fibres are held within a sleeve 26 when inserted into the guide 25. The base 20' of the mould 20 has a plurality of upstanding pins 27 which serve the dual purpose of assisting even distribution of the fibre ends and forming the gas distribution holes in the pot. The pins are sized and distributed as required for correct gas bubble distribution. One form of pin distribution is shown in FIG. 4.

In use, the guide 25 is placed about the mould 20 and the mould 20 filled to the required level with potting material. The platform 21 is then raised to lower the fibre ends into the mould 20. The fibre ends are normally fanned before insertion to ensure even distribution and also trimmed to ensure a uniform length.

Once the potting material has partially cured, the pot is ejected from the mould by raising the central ejector portion 23 of the mould. The mould 20 is normally heated to assist curing. If desired, the mould 20 may be centrifuged during the potting process to assist the penetration of the potting material into the fibre walls.

This process normally results in the ends of the fibres in this pot being sealed, however, it will be appreciated that, by appropriate transverse cutting of the pot, the fibre ends may be opened for withdrawal of filtrate from the lumens.

A trial module 4 of this type was packed with 11,000 fibres (o.d./i.d. 650/380 μm). The fibre lumens at the lower end were blocked with polyurethane and 60 holes of 4.5 mm in diameter distributed within the fibre bundle. The lower end was connected to an air line sealed from the feed.

Figure 5:
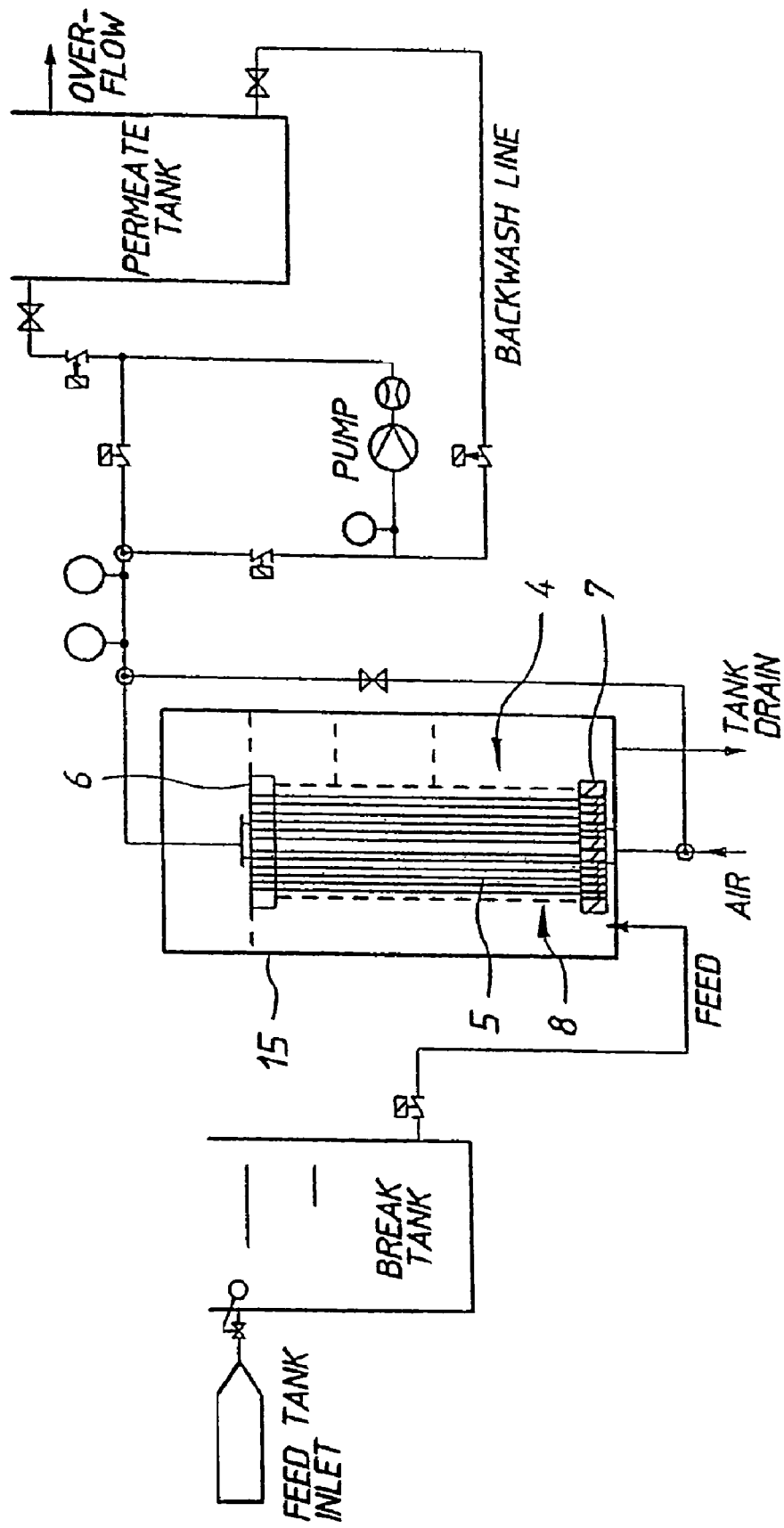
FIG. 5 shows schematic diagram of a filtration system using the membrane module of FIG. 1.

FIG. 5 illustrates the setup of the trial unit. The module 4 was arranged vertically in the cylinder tank 15 and the filtrate withdrawn from the top potting head 6 through suction. Air was introduced into the bottom of the module 4, producing air bubbles between fibres to scrub solids accumulated on membrane surfaces. To remove solids clogged within membrane pores, a small quantity of permeate was pumped through fibre lumens (permeate backwash). One method of operation was to run suction for 15 minutes, then aeration for 2 minutes 15 seconds. After a first minute of aeration, a permeate backwash is introduced for 15 seconds. The cycle returns to suction. After several cycles, the solids in the cylinder tank 15 were concentrated and the water in the tank 15 was drained down to remove concentrated backwash.

In the preferred embodiment shown in FIG. 1, gas/air should be uniformly distributed and flow through the small holes 10 at the lower end of the module 4 so that air bubbles can be produced between fibres 9. Air bubbles then flow upwards producing shear force to scour solids accumulated on the membrane surfaces. If the resistance around the holes 10 is variable due to varying resistance provided by different regions of the fibre bundle, gas/air will tend to flow through those holes associated with a lower resistance, resulting in by-pass flow through these holes.

In the manufacture of membrane modules 4, it is desirable to pot the fibres 9 in a uniform distribution relative to the holes 10. Moreover, smaller and more holes will help distribution of gas/air, but holes that are too small will reduce bubble size and thus the shear force applied to the outer surface of the fibres. It is preferable that size of holes should be within the range of 0.01 to 5 mm, however, it will be appreciated that the size and position of holes 10 will vary with module size, fibre packing density, fibre diameter, fibre pore size and other factors.

Another way to reduce maldistribution of gas/air is to use a layer of porous sheet (not shown) which has much smaller pore size than the holes 10. In this case, the major pressure drop of air will be across the porous sheet. If the porous sheet has uniformly distributed pores, the air distribution across the air end of the module will tend to be evenly spread.

Figure 6:
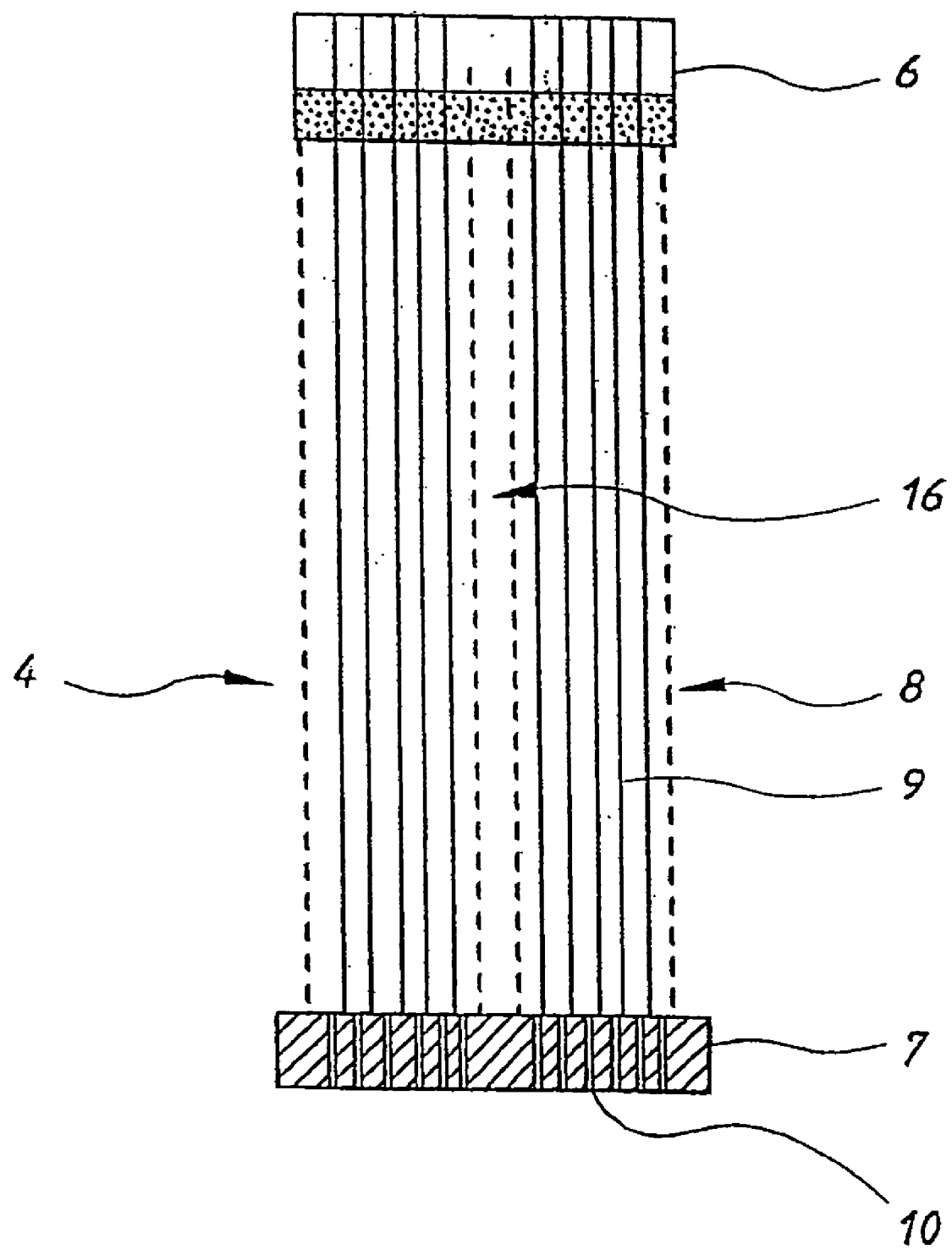
FIG. 6 shows a simplified cross-sectional view of an alternate embodiment of the membrane module according to the present invention.

To further improve distribution of air bubbles, a porous tube 16 can be inserted in the centre of the cylindrical module 4. When air passes through porous tube 16, it produces uniform bubbles which pass out through the array of fibres scouring solids on the fibre membrane walls. It will be appreciated that more than one porous tube could be used and such tubes could be distributed throughout the bundle. Fibres of large pore size or made of non-woven material could also be used as porous tubes within the bundle. FIG. 6 illustrates this form of module.

Figure 7:
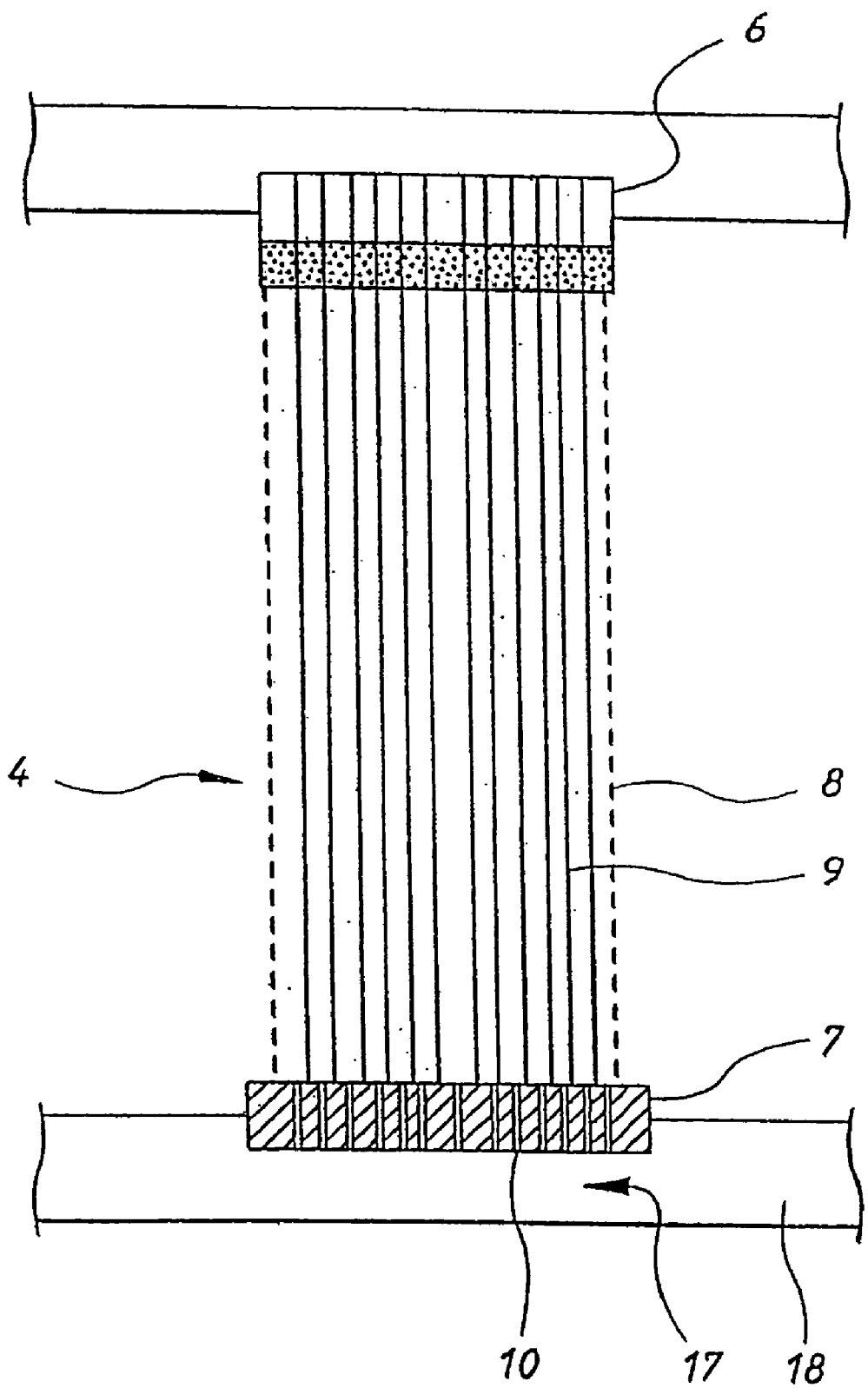
FIG. 7 shows a simplified cross-sectional view of an alternate embodiment in terms of feeding of air to the membrane module of the present invention.

Referring to FIG. 7, air may be fed into a plenum chamber 17 below the aeration holes 10 by an air supply tube running from above the feed tank to the bottom of the membrane module. This tube may run down the centre of the membrane module or down the outside. The plenum chamber 17 may also be connected to or form part of a lower manifold 18 which may be used alternately for supply of aeration gas or as a liquid manifold for removal of concentrated backwash liquid from the tank during draindown or backwashing from the bottom of the module.

Figure 8A:
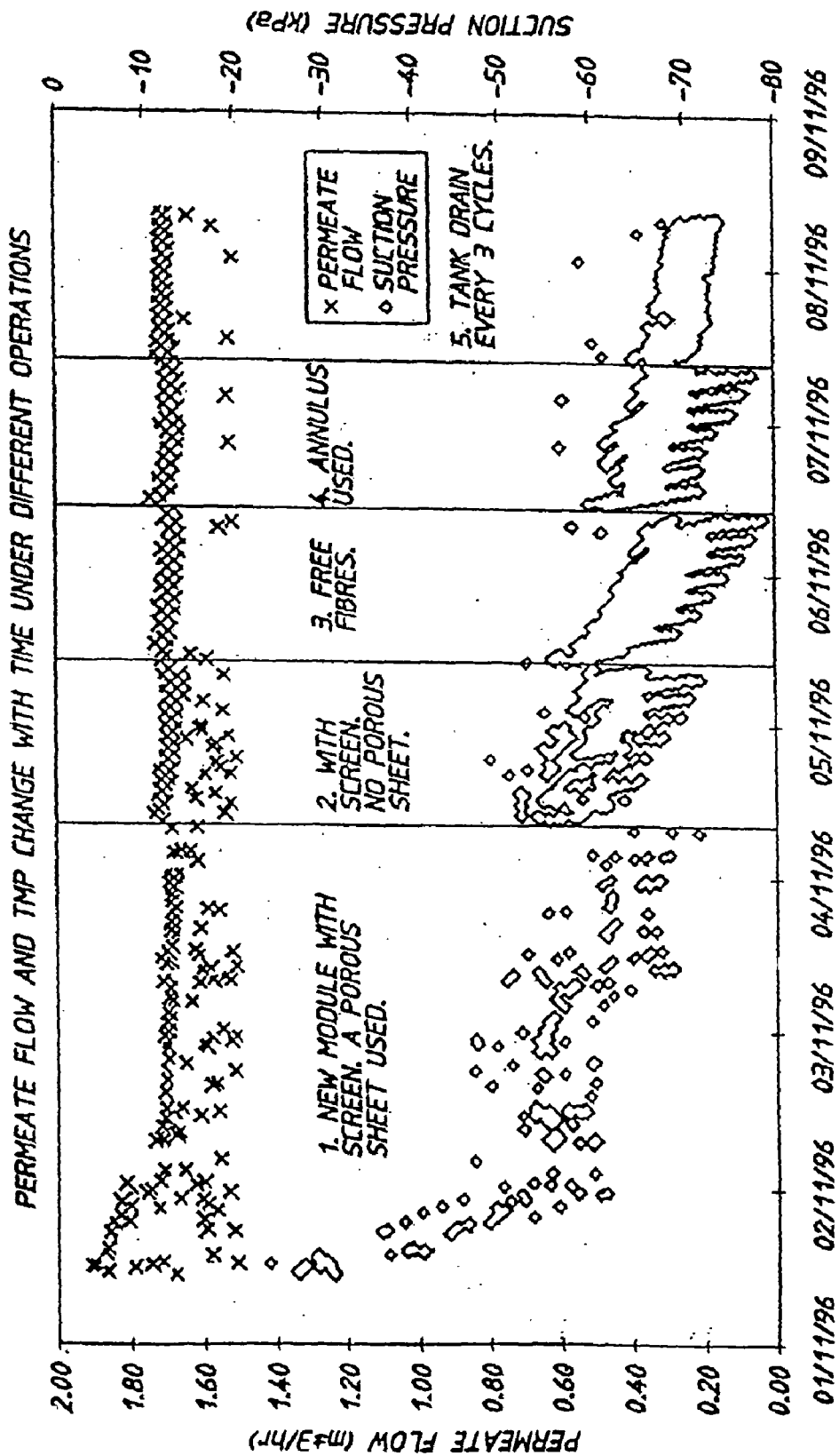
FIGS. 8A and 8B shows two graphs illustrating the suction performance of the module under different conditions.
Figure 8B:
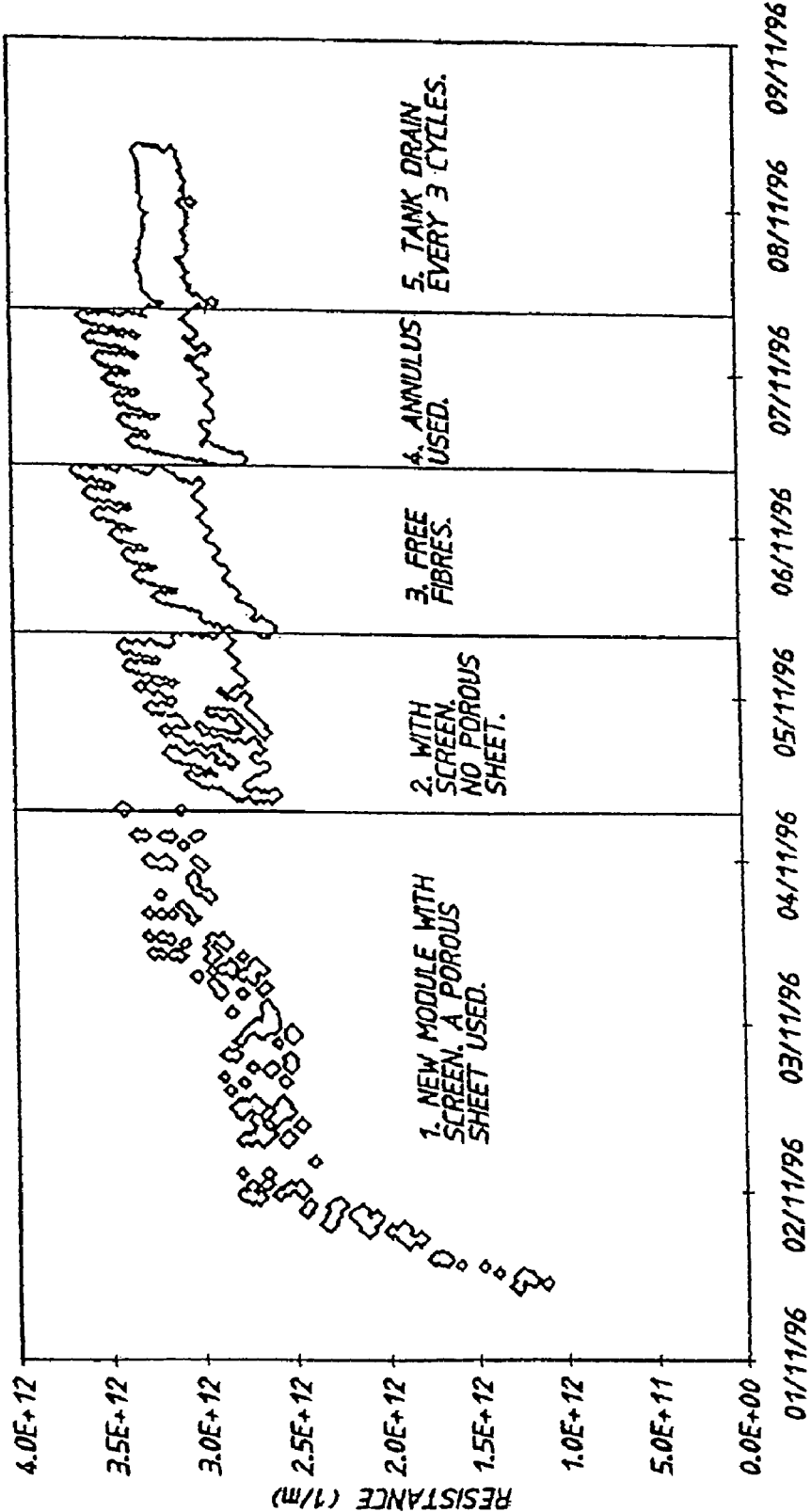

FIGS. 8A and 8B shows the trial results of the same module under different conditions labeled by several zones. The water in the cylinder tank was drained down every 10 cycles in zones 1 to 4. The discharge rate of concentrated liquid waste is thus calculated as 3.2% of the feed volume. Zone 5 was run under the discharge of liquid waste every 3 cycles at a rate of 10.2% of the feed.

Zones 1 and 2 compare the effect of using a porous sheet at the air end on the suction performance for the module with a screen surrounding the fibre bundle. Initially the suction pressure decreased (i.e. TMP increased) quickly because of the module was new. Then both suction pressure and resistance tended to be stable. By comparison, the increase in suction resistance was faster after removing the porous sheet as illustrated in Zone 2. These results illustrate that the air end combined with a porous sheet helps to distribute air between fibres.

The use of the screen 8 has a dual effect on filtration. The restriction of fibre movement by screen facilitates solid accumulation during suction. On the other hand, limited free space between fibres reduces coalescence of air bubbles, producing better scouring effect. It has also been found that the restriction of fibre movement in conjunction with the movement of gas bubbles produces high frequency vibrations in the fibres and rubbing between the closely packed fibre surfaces which further improves the removal of accumulated solids. Zones 3 and 4 in FIGS. 8A and 8B represent results for the same modules with and without a screen.

During the operation in Zone 3 some by-pass of air bubbles was observed. This was due to different resistance around the aeration holes, especially on the border where comparatively less fibres were distributed around those holes. We therefore used a porous annulus sheet covering holes at the outer border of the lower potting head. Results in Zone 4 show the improvement compared to Zone 3.

Solid concentration is an important issue to filtration and fouling rate. When a tank drain was carried out every 10 cycles, solids were built up quickly, which influenced filtration performance. When the tank was drained down every 3 cycles, the increase in suction resistance was significantly reduced as reflected in Zone 5.

Figure 9:
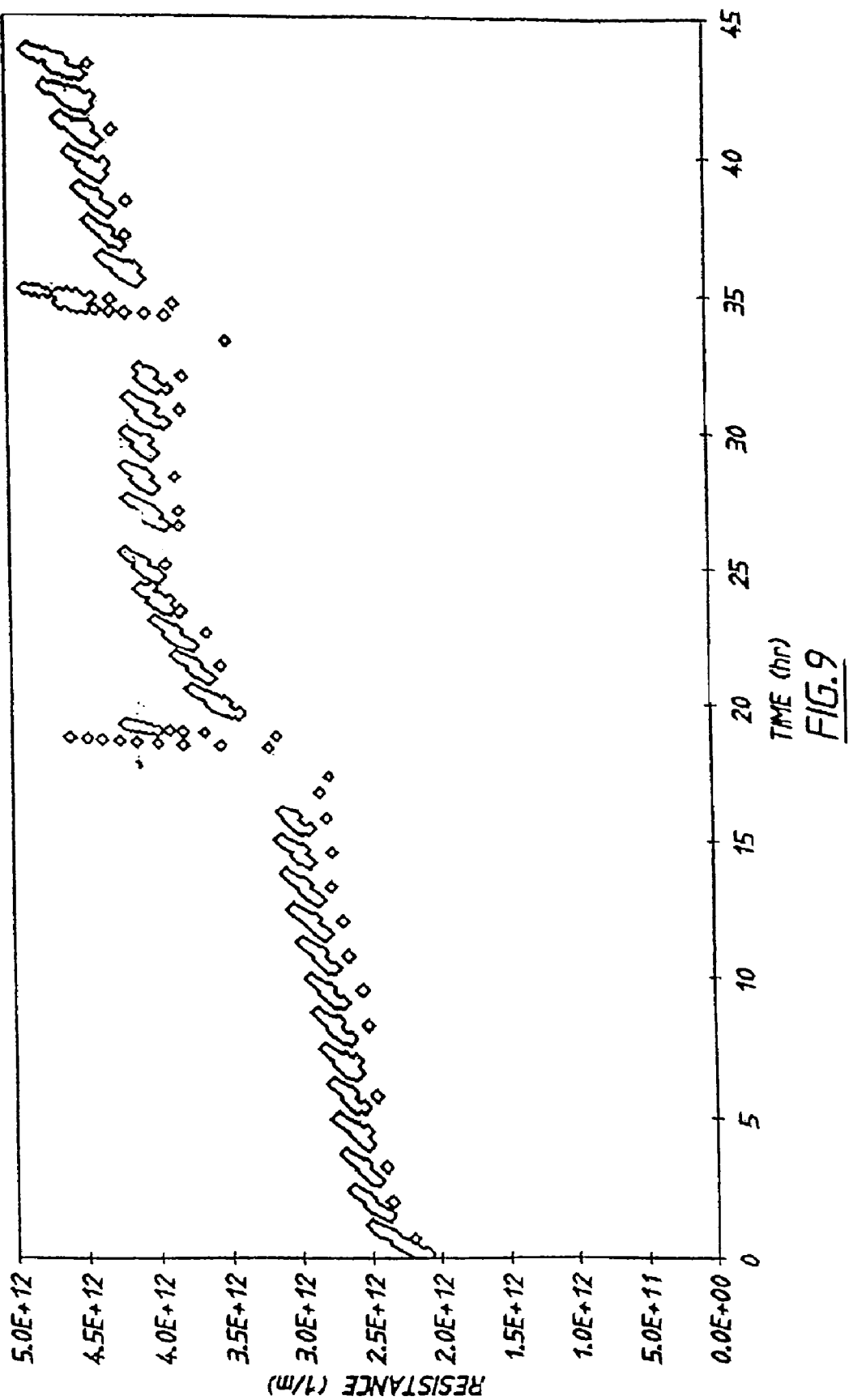
FIG. 9 shows a graph of resistance increase over time with 30 minute suction stage.

The frequency of air scrubbing and backwash on the filtration performance was also investigated. FIG. 9 shows the resistance increase for 30 minute suction and then backwash and air scrubbing. Compared with the resistance increase in Zone 5 in FIG. 8, resistance increase was faster when suction time was longer between backwashes.

Figure 10:
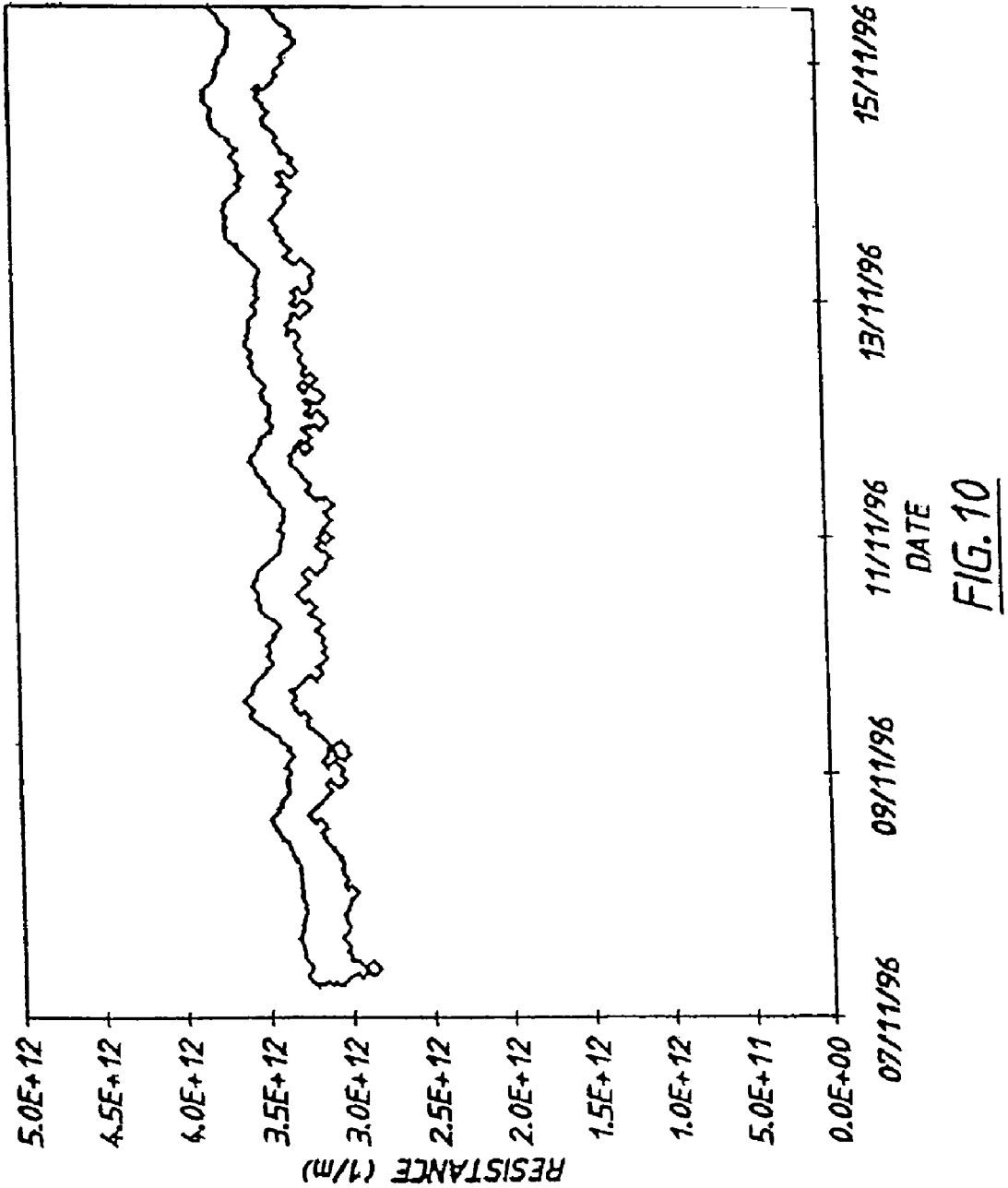
FIG. 10 shows a graph of resistance increase over time between backwashes without a porous sheet.
Figure 11:
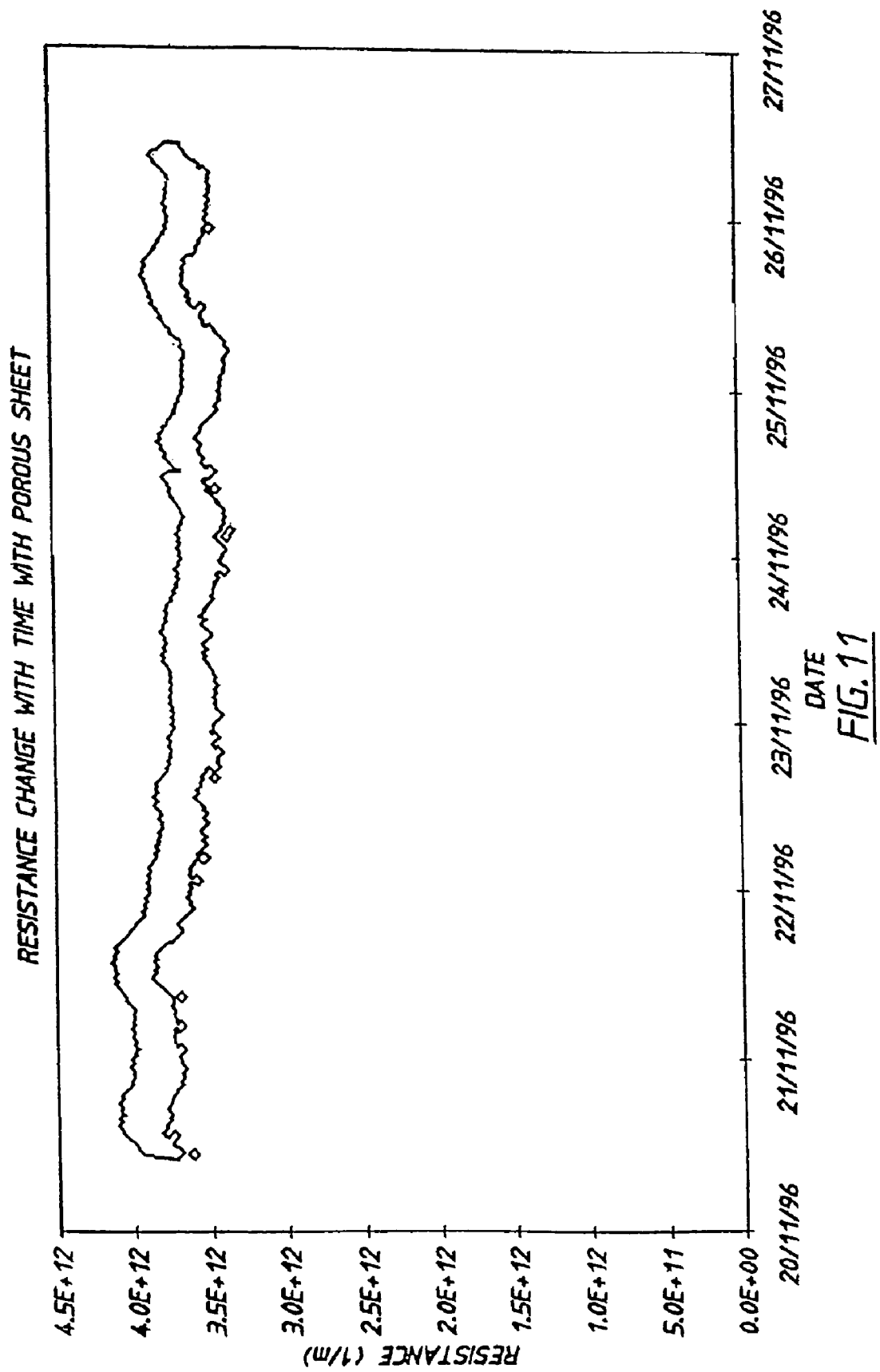
FIG. 11 shows a graph of resistance increase over time between backwashes with the porous sheet.

Longer term trials were conducted to compare the effect of porous sheet on suction performance. FIGS. 10 and 11 show the resistance increase for more than 6 days operation, with and without the porous sheet. For the module not connected to a porous sheet, suction resistance increased slowly by ca. 20% during 8 days, while no obvious resistance increase during 6 days operation when a porous sheet was used to improve air distribution. These results and the result shown in Zones 1 and 2 in FIG. 8 suggest that a porous sheet helps uniform air distribution.

Figure 12:
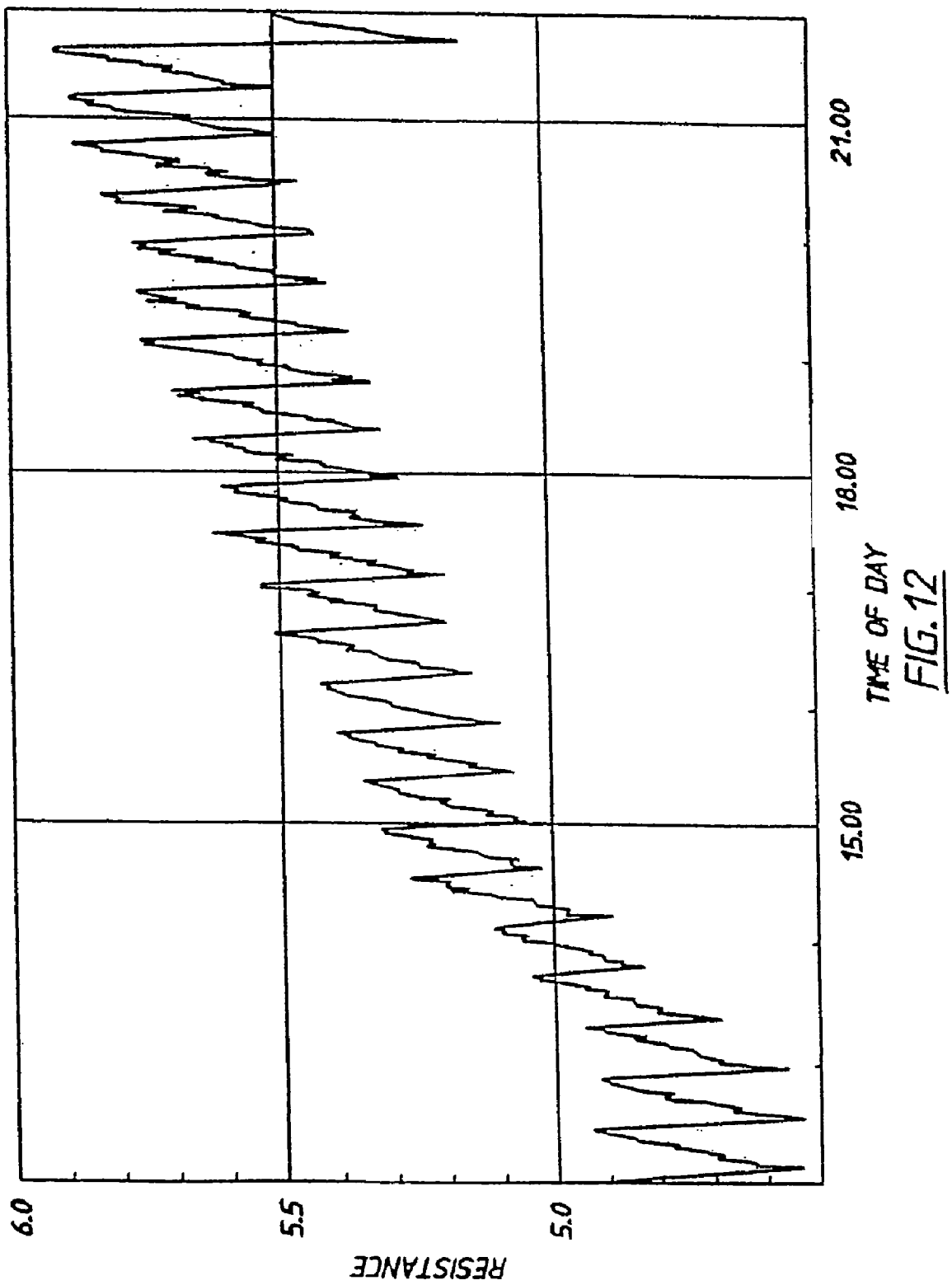
FIG. 12 shows a graph of resistance changes over time with gas bubble scouring at regular intervals but no liquid backwash of the fibre membranes.
Figure 13:
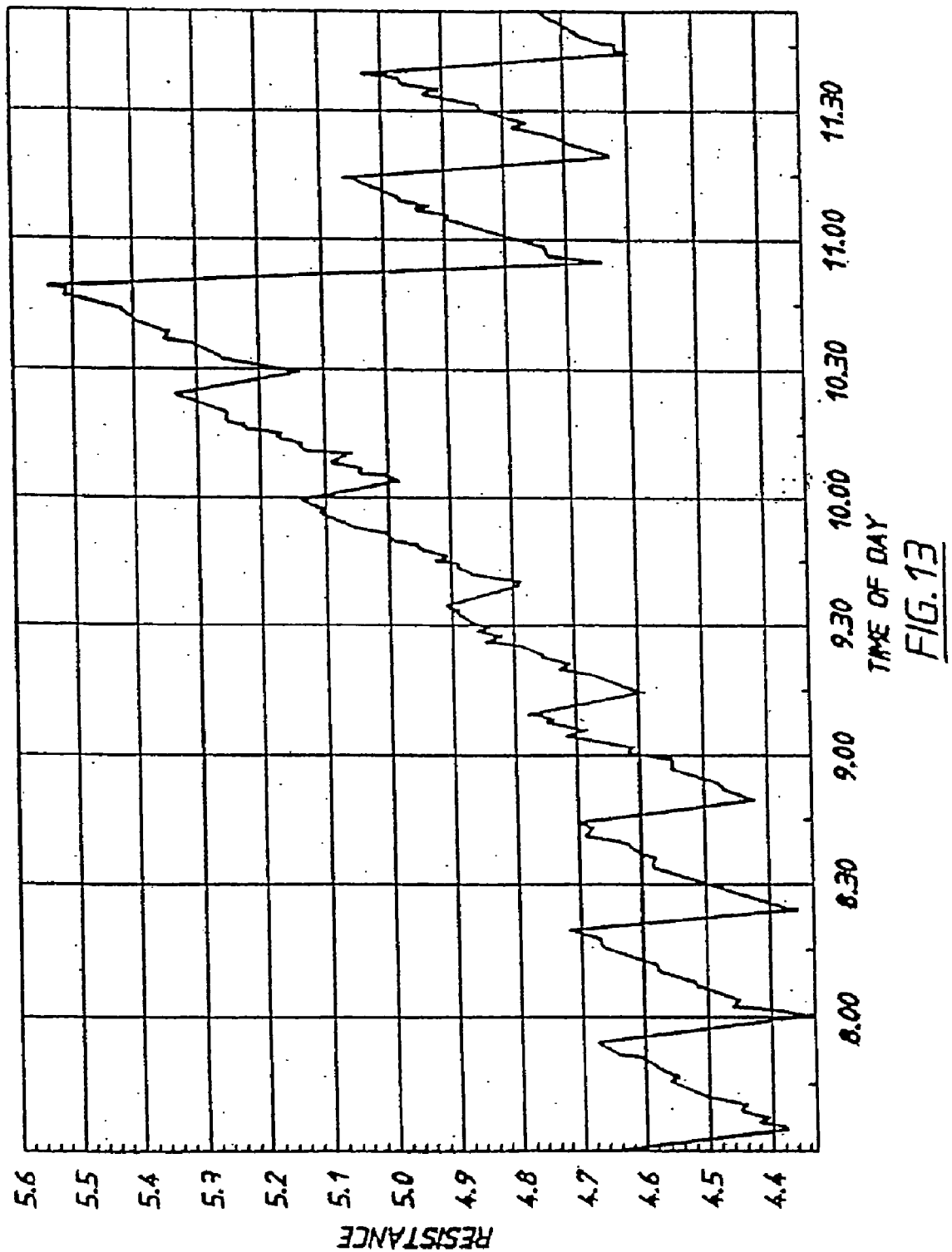
FIG. 13 shows a similar graph to FIG. 12 illustrating the effect of no bubble scouring on backwash efficiency.
Figure 14:
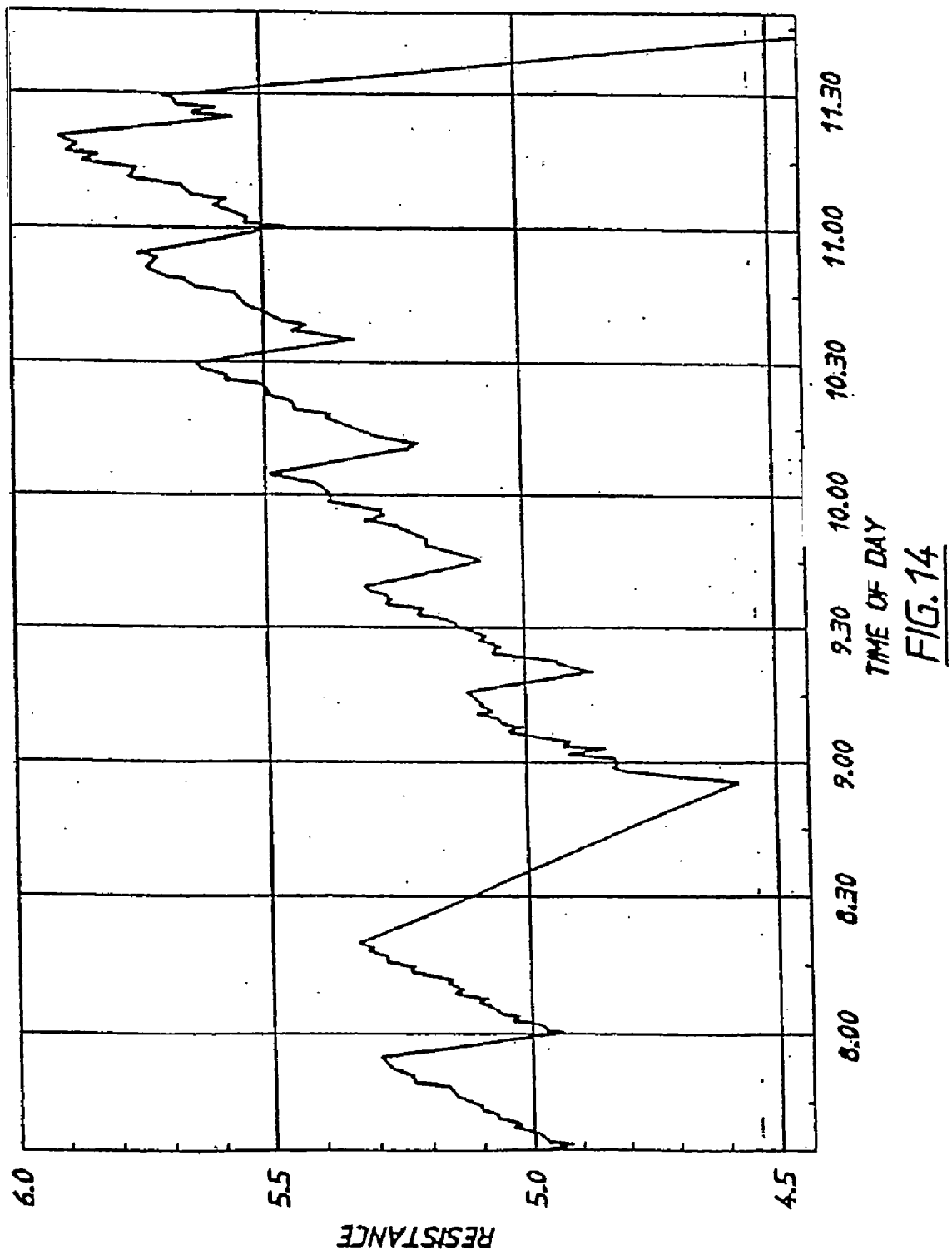
FIG. 14 shows a similar graph to FIG. 12 illustrating the effect of applying gas bubble scouring to the outer side of the fibre bundle only.
Figure 15A:
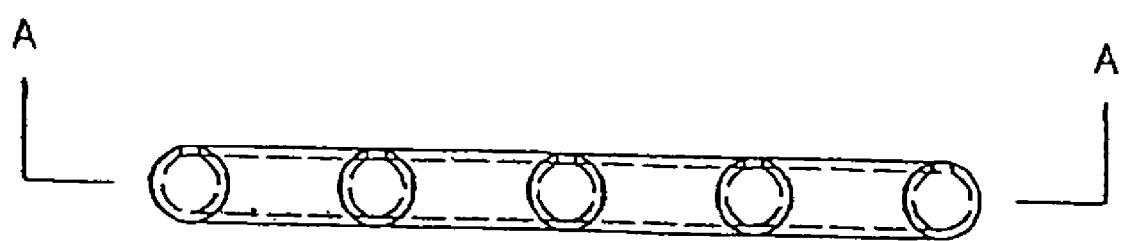
FIGS. 15a-c show a comb of tubes containing holes, the tube sitting within a module and providing pressurized gas bubbles.
Figure 15B:
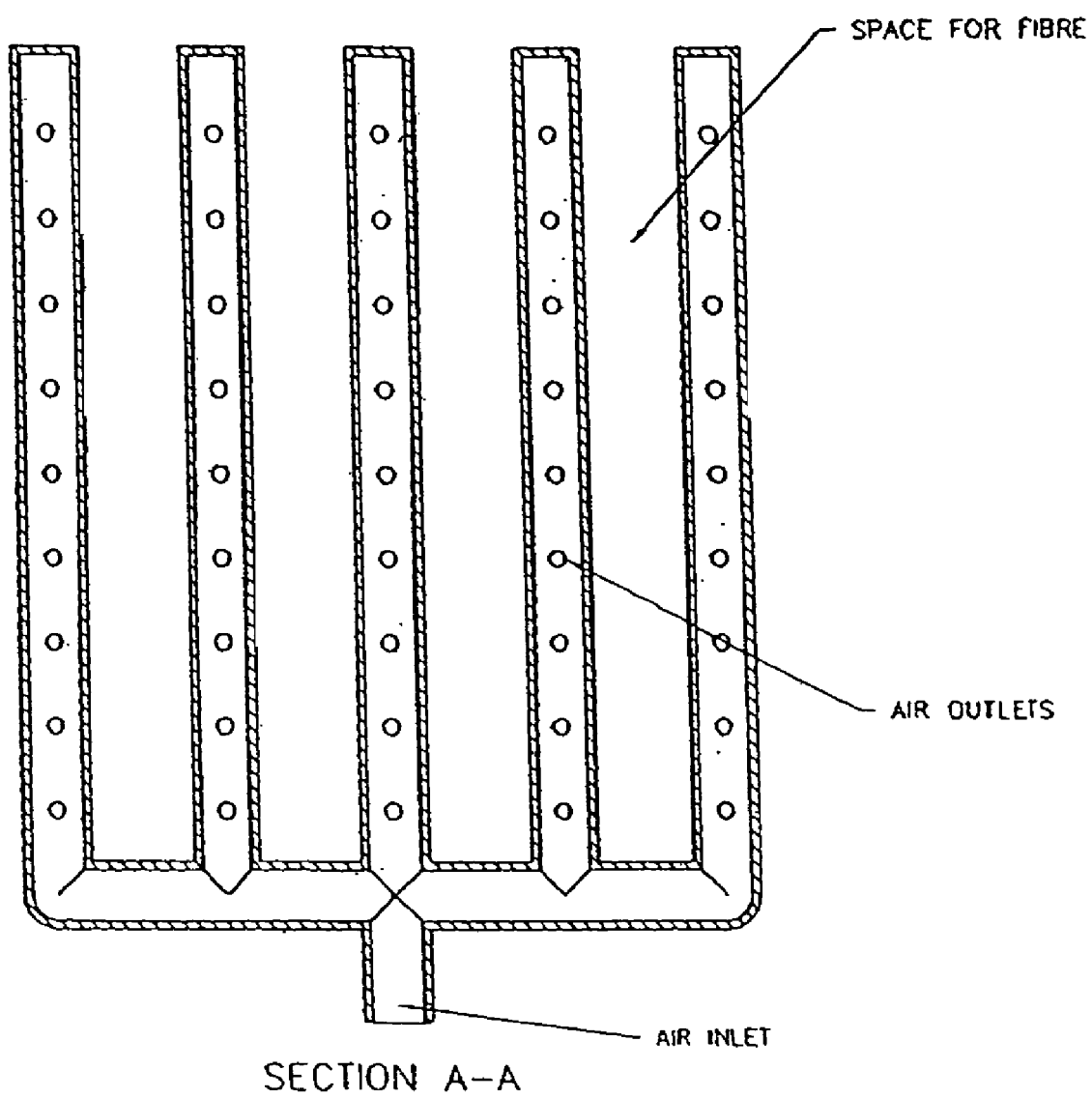
Figure 15C:
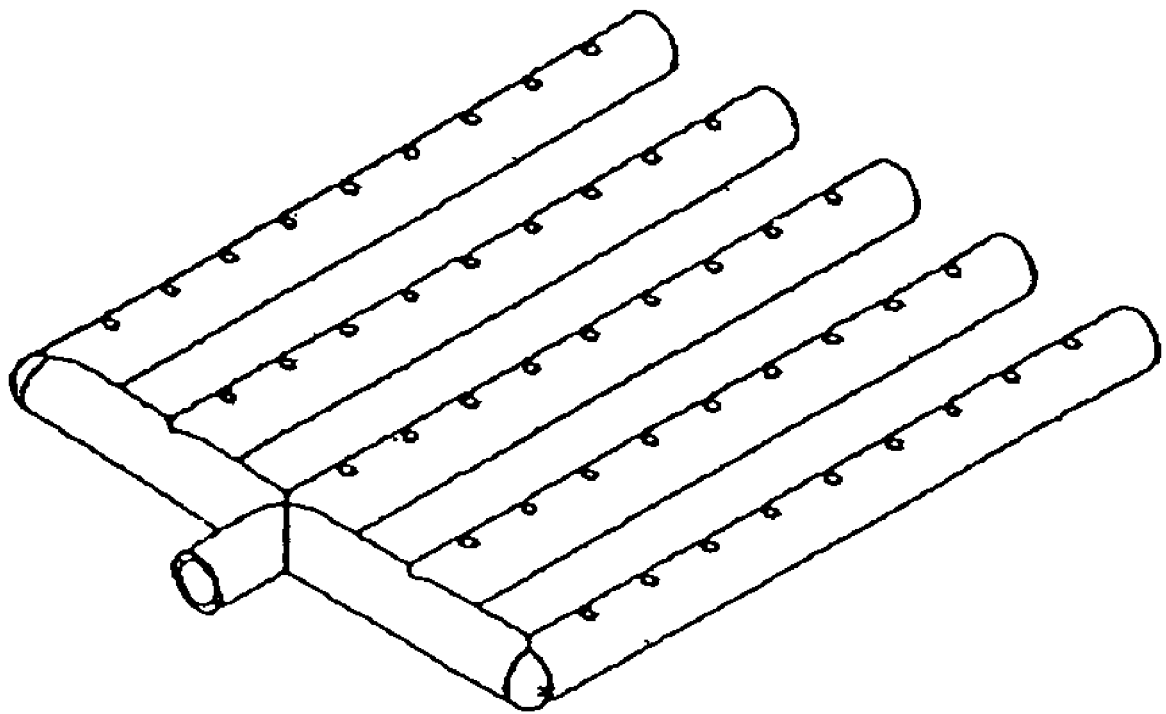
Figure 16:
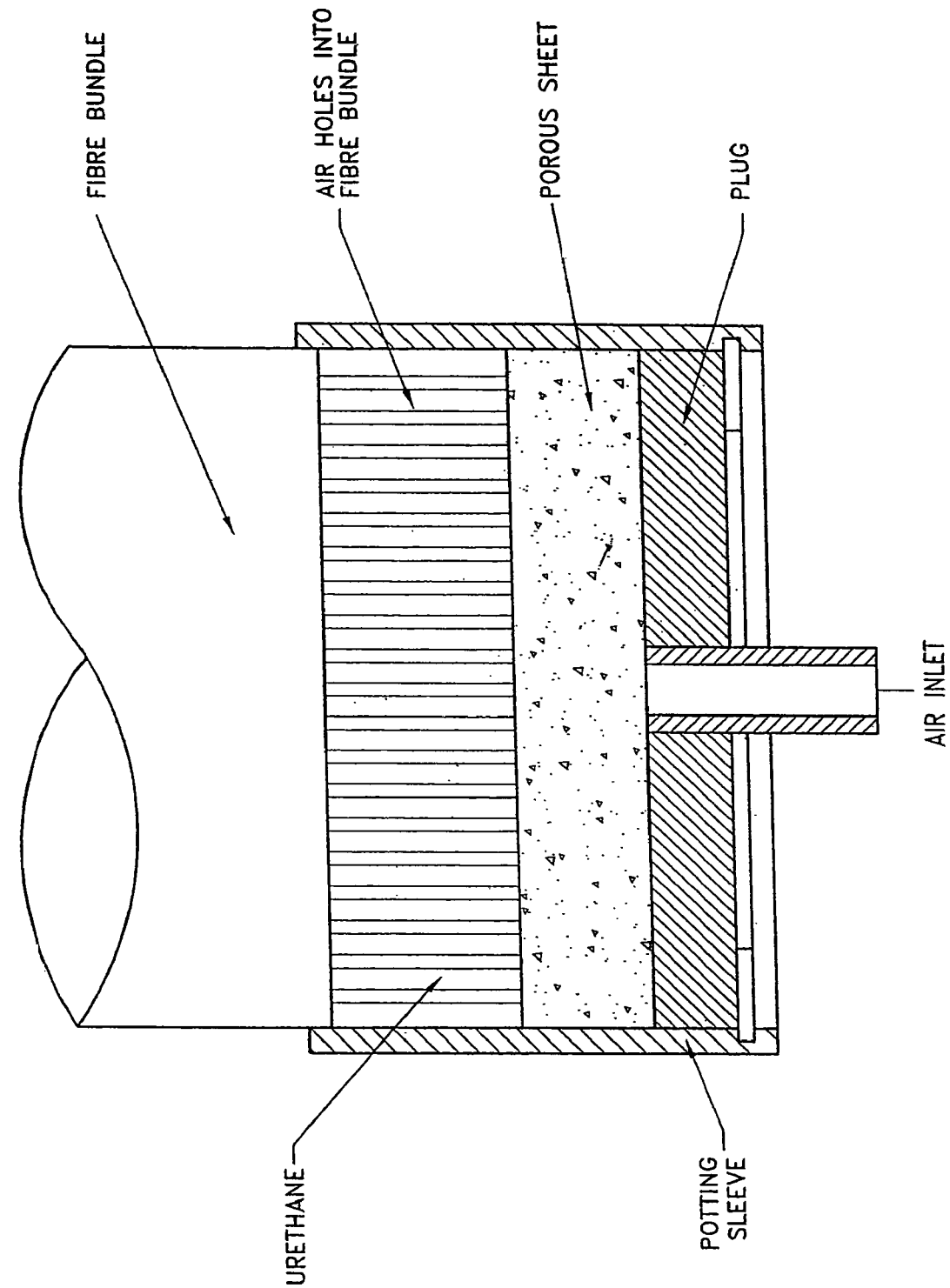
FIG. 16 shows a module incorporating a porous sheet through which pressurized gas is supplied to provide gas bubbles.

FIGS. 12-14 are graphs which illustrate the effect of the bubble scouring on backwash efficiency. The scouring is conducted a regular intervals as shown the buildup of resistance followed by a sharp decline at the time of the scouring stage.

FIG. 12 shows the effect of not using a liquid backwash in conjunction with the gas scouring. At the beginning of the test a normal liquid backwash where filtrate is pumped back through the fibre lumens as a liquid backwash in conjunction with the gas scouring along the outside of the fibres. The liquid backwash was then stopped and only regular gas scouring was used. It was found that even without the liquid backwash a backwash efficiency of around 90% could be achieved.

FIG. 13 shows the effect of no gas scouring during the backwash phase. Again the initial part of the test used a normal liquid backwash where filtrate is pumped back through the fibre lumens as a liquid backwash in conjunction with the gas scouring along the outside of the fibres. The gas scouring was then stopped between about 9:15 and 10:45. As shown on the graph the backwash efficiency dropped dramatically from about 96% using gas scouring to about 41% without gas scouring. The return of gas scouring showed a marked improvement in backwash efficiency.

FIG. 14 illustrates the effect of scouring fully within the bundle as against scouring only the outer fibres. Again the beginning of the test shows a normal backwash regime with liquid backwash and gas scouring up until around 9:00. The gas scouring was then limited to the outside of the fibre bundle. The backwash efficiency again degraded dramatically from about 98% during normal operation to 58% with the restricted gas scouring.

The embodiments relate to membrane filtration systems and typically to a system using suction to produce transmembrane pressure, however, it will be appreciated that the scouring system is equally applicable to any form of fibre membrane filtration process, including pressurised filtration systems.

The scouring process and method may be used in conjunction with any standard backwashing regimes including liquid backwashing, pressurised gas backwashing, combinations of both, as well as with chemical cleaning and dosing arrangements.

The scouring process would normally be used in conjunction with the backwash stage, however, it may also be used continually during the filtration and backwash stages. Cleaning chemicals such as chlorine may be added to the gas providing the bubbles to further assist the scouring process. Solids removed in the scouring process may be intermittently or continually removed. With continual removal of solid a clarifier or the like can be used. The clarifier can be used in front of the module, in parallel with module or the module can be in the clarifier itself. Chemical dosing can be used in conjunction with the clarifier when required.

The filter system using such a scouring process may be used for sewage/biological waste treatment or combined with a bioreactor, activated sludge or similar system.

It will be appreciated that further embodiments and exemplifications of the invention are possible without departing from the spirit or scope of the invention described.

What is claimed is:

1. A method of removing accumulated solids from outer surfaces of porous hollow fiber membranes arranged in close proximity to one another and mounted between potting heads with a cured potting material, wherein the membranes are situated in a vessel, the method comprising the steps of:
    backwashing the membranes to dislodge accumulated solids from the outer surfaces of the membranes;
    restricting movement of the membranes;
    providing, through at least one porous tube disposed among and substantially parallel to the membranes, uniform gas bubbles which pass out among the membranes scouring solids on the outer surfaces of the membranes;
    providing gas bubbles through a porous sheet and a plurality of gas distribution openings in a first potting head, the plurality of gas distribution openings each having a diameter from about 0.01 mm to about 5 mm, and the porous sheet having uniformly distributed pores and a smaller pore size relative to the gas distribution openings in the first potting head; and
    removing dislodged accumulated solids from the vessel.

2. The method according to claim 1, wherein the removing step comprises draining down liquid from the vessel.

3. The method according to claim 2, wherein the draining down comprises a periodic draindown.

4. The method according to claim 1, wherein the removing step comprises using a clarifier.

5. The method according to claim 1, wherein the removing step comprises overflowing liquid from the vessel.

6. The method according to claim 5, wherein the overflowing comprises a periodic overflow.

7. The method according to claim 1, wherein the removing step comprises a continual bleed off.

8. The method according to claim 1, wherein the backwashing comprises backwashing with a gas.

9. The method according to claim 1, wherein the backwashing comprises backwashing with a liquid.

10. The method of claim 9, wherein the liquid comprises a permeate.

11. The method of claim 1, wherein the steps of backwashing and providing gas bubbles to the membrane occur simultaneously.

12. The method of claim 1, wherein the porous hollow fiber membranes extend longitudinally in an array to form a membrane module contained within the vessel.

13. The method of claim 1, wherein the membranes are mounted in a header in close proximity to one another so as to prevent excessive movement therebetween.

14. The method of claim 1, wherein the gas bubbles move past the outer surfaces of the membranes and vibrate the membranes to dislodge the accumulated solids therefrom.

15. The method of claim 1, wherein the membranes are mounted relative to one another so as to produce a rubbing effect between the membranes when vibrated.

16. The method of claim 1, wherein the hollow fiber membranes are arranged in at least one bundle.

17. The method of claim 1, wherein the hollow fiber membranes are surrounded by a perforated cage.

18. The method of claim 1, wherein the tube comprises a plurality of holes.

19. The method of claim 1, further comprising subjecting the membranes to a chemical cleaning.

20. The method of claim 1, further comprising subjecting the membranes to a chemical dosing.

21. The method of claim 1, wherein the gas bubbles are continuously provided.

22. The method of claim 1, wherein the gas bubbles are intermittently provided.

23. The method of claim 1, wherein backwashing the membranes occurs prior to providing gas bubbles to the membranes.

24. A membrane module, comprising:
    a plurality of porous membranes, the membranes being arranged in close proximity to one another and mounted between potting heads with a cured potting material,
    means for restricting membrane movement;
    at least one porous tube located within the module;
    a plurality of gas distribution openings in a first potting head each having a diameter from about 0.01 mm to about 5 mm; and
    a porous sheet having uniformly distributed pores and a smaller pore size relative to the gas distribution openings in the first potting head;
    the module constructed and arranged such that, in use, gas moves through the porous sheet, the gas distribution openings and the at least one porous tube but not through the pores of said membranes producing uniform bubbles which pass out among the membranes scouring solids on the membranes,
    wherein the membranes comprise hollow fibre membranes and the at least one porous tube extends longitudinally between the potting heads among the membranes.

* * * * *